US009040648B2

(12) United States Patent
    Hickenboth et al.

(10) Patent No.: US 9,040,648 B2
(45) Date of Patent: May 26, 2015

(54) POLYMER COMPOSITIONS CONTAINING MECHANOCHROMIC POLYMERS

(71) Applicant: PPG Industries Ohio, Inc., Cleveland, OH (US)

(72) Inventors: Charles R. Hickenboth, Cranberry Township, PA (US); Cynthia Kutchko, Pittsburgh, PA (US); Matthew J. Kryger, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/834,081

(22) Filed: Mar. 15, 2013

(65) Prior Publication Data

US 2013/0274412 A1     Oct. 17, 2013

Related U.S. Application Data

(63) Continuation-in-part of application No. 13/447,604, filed on Apr. 16, 2012.

(51) Int. Cl.
| | |
|---|---|
| *C08F 4/32* | (2006.01) |
| *C08F 20/10* | (2006.01) |
| *C08L 33/08* | (2006.01) |
| *C08G 73/06* | (2006.01) |
| *C08G 18/67* | (2006.01) |
| *C08G 18/81* | (2006.01) |

(Continued)

(52) U.S. Cl.
CPC .......... *C08G 73/0688* (2013.01); *C08G 18/671* (2013.01); *C08G 18/8125* (2013.01); *C09D 175/14* (2013.01); *G03C 1/733* (2013.01); *C08G 18/4854* (2013.01); *C08G 18/6254* (2013.01); *C08G 18/722* (2013.01); *C08G 18/755* (2013.01); *C08G 18/758* (2013.01); *C08G 18/2081* (2013.01); *C08G 18/227* (2013.01); *C09D 175/04* (2013.01); *C08G 18/381* (2013.01); *C08G 18/4063* (2013.01); *C08G 18/44* (2013.01)

(58) Field of Classification Search
CPC ............ C08F 4/32; C08F 20/10; C08L 33/08; C08G 73/0688; C09D 175/04
USPC ............ 526/329.7, 328.5; 524/559, 560, 606; 428/446, 704; 525/330.3, 330.4, 330.5, 525/421
See application file for complete search history.

(56) References Cited

U.S. PATENT DOCUMENTS 4,980,089 A    12/1990  Heller
5,166,345 A    11/1992  Akashi et al.

(Continued)

FOREIGN PATENT DOCUMENTS

EP    1810982 A1    7/2007
WO    0119813 A1    3/2001

(Continued)

OTHER PUBLICATIONS

Davis et al. "Force-induced activation of covalent bonds in mechanoresponsive polymeric materials", Nature, May 7, 2009, pp. 68-72, vol. 459.

(Continued)

*Primary Examiner* — Robert Harlan
(74) *Attorney, Agent, or Firm* — The Webb Law Firm

(57) ABSTRACT

The present invention relates to a polymer composition that includes a polymer having at least one polymer segment represented by the following Formula (I), $$\phi \text{---} (M)_w \text{---}_z \qquad (I)$$

With reference to Formula (I): M independently for each w is a residue of a monomer; $\phi$ is a residue of a mechanochromic compound having at least two reactive groups that are each independently bonded to one monomer residue M; w, independently for each z, is an integer of at least 1; and z is an integer of at least 2. The mechanochromic compound is selected from at least one of the following, (a) a spirooxazine compound represented by the following Formula (II), (II)

[structure showing spirooxazine with substituents $R_5$, $R_6$, $(R_1)_n$, $(R_3)_q$, $R_4$, $(R_2)_p$]

and
(b) an indenonaphthopyran represented by the following Formula (III), (III)

[structure showing indenonaphthopyran with substituents $(R_8)_y$, $R_9$, $R_{10}$, $(R_7)_x$, B, B']

22 Claims, No Drawings

(51) Int. Cl.
    *C09D 175/14*     (2006.01)
    *G03C 1/73*     (2006.01)
    *C08G 18/48*     (2006.01)
    *C08G 18/62*     (2006.01)
    *C08G 18/72*     (2006.01)
    *C08G 18/75*     (2006.01)
    *C08G 18/20*     (2006.01)
    *C08G 18/22*     (2006.01)
    *C09D 175/04*     (2006.01)
    *C08G 18/38*     (2006.01)
    *C08G 18/40*     (2006.01)
    *C08G 18/44*     (2006.01)

(56) References Cited

U.S. PATENT DOCUMENTS

| | | | |
|---|---|---|---|
| 5,430,146 | A | 7/1995 | Tanaka et al. |
| 5,807,937 | A | 9/1998 | Matyjaszewski et al. |
| 6,019,914 | A | 2/2000 | Lokshin et al. |
| 6,268,433 | B1 | 7/2001 | Barkac et al. |
| 6,441,066 | B1 * | 8/2002 | Woodworth et al. ........... 524/88 |
| 7,189,456 | B2 | 3/2007 | King |
| 7,438,972 | B2 | 10/2008 | Faler et al. |
| 7,605,194 | B2 | 10/2009 | Ferencz et al. |
| 8,236,914 | B2 * | 8/2012 | Potisek et al. ............. 526/329.7 |
| 2001/0025948 | A1 | 10/2001 | Walters et al. |
| 2010/0206088 | A1 | 8/2010 | Potisek et al. |
| 2012/0101515 | A1 | 4/2012 | Barbod |
| 2012/0133521 | A1 | 5/2012 | Rothkopf et al. |

FOREIGN PATENT DOCUMENTS

| | | | | |
|---|---|---|---|---|
| WO | 2004041961 | A1 | 5/2004 | |
| WO | WO 2004/041961 | A1 * | 5/2004 | ............... C09K 9/02 |
| WO | 2006024099 | A1 | 3/2006 | |

OTHER PUBLICATIONS

Hickenboth et al. "Biasing reaction pathways with mechanical force", Nature, Mar. 22, 2007, pp. 423-427, vol. 446.

Kingsbury et al. "Shear activation of mechanophore-crosslinked polymers", J. Mater. Chem., 2011, pp. 8381-8388 , vol. 21.

Kim et al. "A mechanochromic smart material", Polymer Bulletin, 1993, pp. 367-374, vol. 31.

Lee et al. "Force-Induced Redistribution of a Chemical Equilibrium", Journal of the American Chemical Society, Oct. 26, 2010, pp. 16107-16111, vol. 132.

Potisek et al. "Mechanophore-Linked Addition Polymers", Journal of the American Chemical Society, Oct. 24, 2007, pp. 13808-13809, vol. 129.

Beiermann et al., "Role of Mechanophore Orientation in Mechanochemical Reactions", ACS Macro Lett. 2012, pp. 163-166, vol. 1.

Brantley et al., "Polymer Mechanochemistry: the design and study of mechanophores", Polym Int (2012).

O'Bryan et al., "Stress Sensing in Polycaprolactone Films via an Embedded Photochromic Compound", ACS Applied Materials and Interfaces, May 19, 2010, pp. 1594-1600, vol. 2, No. 6.

* cited by examiner

US 9,040,648 B2

1

POLYMER COMPOSITIONS CONTAINING MECHANOCHROMIC POLYMERS

CROSS REFERENCE TO RELATED PATENT APPLICATION

The present patent application is a continuation in part of and claims priority to U.S. patent application Ser. No. 13/447,604, filed on Apr. 16, 2012 the disclosure of which is incorporated herein by reference in its entirety.

FIELD OF THE INVENTION

The present invention relates polymer compositions that include a polymer having at least one polymer chain segment that includes a residue of one or more spirooxazine compounds and/or a residue of one or more indenonaphthopyran compounds, and mechanochromic articles that include such polymer compositions.

BACKGROUND OF THE INVENTION

Various articles, such as protective articles and support articles are typically fabricated at least in part from polymeric materials. Protective articles, such as helmets, safety lenses, and protective housings, and support articles, such as beams can be subjected to stresses and/or impacts that result in damage to the article, which could lead to catastrophic failure of the article at a point in time after the damage occurred. In some instances, the occurrence or presence of such damage is not accompanied by a visually observable indication thereof in the article. In the absence of a visually observable indication of the damage, the damaged article would not likely be withdrawn from use, and an unexpected catastrophic failure of the article could occur.

Mechanochromic materials change color in response to a change in mechanical stress, such as impacts. It is known that mechanochromic materials can be incorporated into certain articles so as to provide a visual indication that the article has undergone a threshold mechanical stress event, which could result in catastrophic failure thereof. Some mechanochromic materials can undergo a reduction in stability over time, which can result in reduced mechanochromic properties. A reduction in mechanochromic properties can be accompanied by an undesirable reduction in a visually observable indication that the article in question has undergone a threshold mechanical stress event.

It would be desirable to develop new mechanochromic materials that can be used to provide a visually observable indication that an article, which incorporates such mechanochromic materials, has undergone a threshold mechanical stress event. It would be additionally desirable that such newly developed mechanochromic materials posses improved stability.

SUMMARY OF THE INVENTION

In accordance with the present invention, there is provided a polymer composition comprising a polymer, in which the polymer comprises at least one polymer chain segment represented by the following Formula (I),

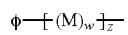
(I)

2

With reference to Formula (I): M independently for each w is a residue of a monomer; φ is a residue of a mechanochromic compound having at least two reactive groups that are each independently bonded to one monomer residue M; w, independently for each z, is an integer of at least 1, and z is an integer of at least 2.

With further reference to Formula (I) the mechanochromic compound, which φ is a residue, is selected from, (a) a spirooxazine compound represented by the following Formula (II),

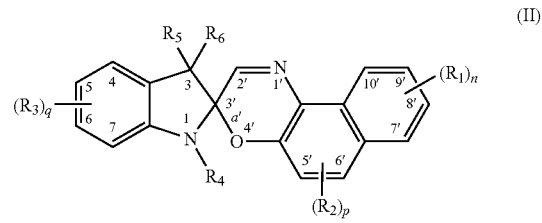
(II)

With reference to Formula (II), n is from 1 to 4, p is from 1 to 2, is from 1 to 4, and $R_1$ independently for each n, $R_2$ independently for each p, $R_3$ independently for each $R_5$, and $R_6$ are each independently selected from hydrogen, hydrocarbyl and substituted hydrocarbyl each optionally interrupted with at least one of —O—, —S—, —O(O)—, —O(O)O—, C(O)O—, —S(O)—, —SO$_2$—, —N(R$^{11}$)—, and —Si(R$^{11}$)(R$^{12}$)— wherein R$^{11}$ and R$^{12}$ are each independently selected from hydrogen, hydrocarbyl and substituted hydrocarbyl, and combinations of two or more thereof.

With additional reference to the spirooxazine represented by Formula (II), there is the proviso that at least two of, $R_1$ independently for each n, $R_2$ independently for each p, $R_3$ independently for each q, $R_4$, $R_5$, and $R_6$, each independently comprise the reactive group that is independently bonded to one monomer residue M.

With further reference to Formula (I) the mechanochromic compound, of which φ is a residue, is also selected from, (b) an indenonaphthopyran represented by the following Formula (III),

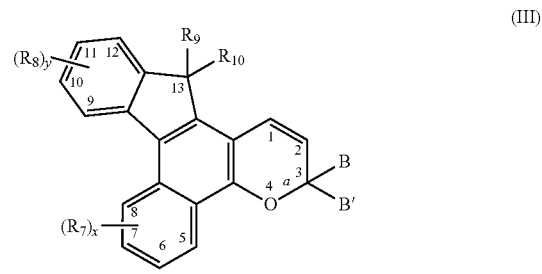
(III)

With reference to Formula (III), x is from 1 to 4, y is from 1 to 4, $R_7$ independently for each x, $R_8$ independently for each y, $R_9$, and $R_{10}$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N(R$^{11}$)—, and —Si(R$^{11}$)(R$^{12}$)— wherein R$^{11}$ and R$^{12}$ are each independently selected from hydrogen, hydrocarbyl and substituted hydrocarbyl, and combinations of two or more thereof.

With additional reference to Formula (III), B and B' are each independently selected from unsubstituted aryl, substituted aryl, unsubstituted heteroaryl, substituted heteroaryl, and polyalkoxy, or B and B' taken together form a ring structure selected from unsubstituted fluoren-9-ylidene, substituted fluoren-9-ylidene, saturated spiro-monocyclic hydrocarbon ring, saturated spiro-bicyclic; hydrocarbon ring, and spiro tricyclic hydrocarbon ring.

With regard to the indenonaphthopyran represented by Formula (III), there is the proviso that at least two of, $R_7$, $R_8$, $R_9$, $R_{10}$, B, and B' each independently comprise the reactive group that is independently bonded to one monomer residue M.

In accordance with the present invention, there is further provided a mechanochromic article comprising the polymer composition as described above. The mechanochromic article can, with some embodiments of the present invention, be selected from films, sheets, and 3-dimensional articles.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION OF THE INVENTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.6 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

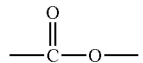

or equivalently —C(O)O—, is inclusive of the right-to-left representation thereof,

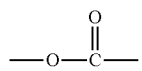

or equivalently —O(O)O— or —OC(O)—.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

As used herein, spatial or directional terms, such as "left", "right", "inner", "outer", "above", "below", and the like, relate to the invention as it is depicted in the drawing figures. However, it is to be understood that the invention can assume various alternative orientations and, accordingly, such terms are not to be considered as limiting.

As used herein, the terms "formed over," "deposited over," "provided over," "applied over," residing over or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, the term "ring position" and related terms, such as "ring positions," means a particular position in a ring structure, such as the fused ring structure, of a chemical compound, such as the spirooxazine compounds represented by Formula (I) and the indenonaphthopyran compounds represented by Formula (II), and which are depicted herein in accordance with some embodiments by numbers within the ring structures of the related representative chemical formulas.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear, such as linear $C_2$-$C_{20}$ alkyl groups; and groups that are appropriately branched, such as branched $C_3$-$C_{20}$ alkyl groups.

As used herein the term "hydrocarbyl" and similar terms, such as "hydrocarbyl substituent," means. linear or branched $C_1$-$C_{25}$ alkyl (e.g., linear or branched $C_1$-$C_{10}$ alkyl); linear or branched $C_2$-$C_{25}$ alkenyl (e.g., linear or branched $C_2$-$C_{10}$ alkenyl); linear or branched $C_2$-$C_{25}$ alkynyl (e.g., linear or branched $C_2$-$C_{10}$ alkynyl); $C_3$-$C_{12}$ cycloalkyl (e.g., $C_3$-$C_{10}$ cycloalkyl); $C_3$-$C_{12}$ heterocycloalkyl (having at least one hetero atom in the cyclic ring); $C_5$-$C_{18}$ aryl (including polycyclic aryl groups) (e.g., $C_5$-$C_{10}$ aryl); $C_5$-$C_{18}$ heteroaryl (having at least one hetero atom in the aromatic ring); and $C_6$-$C_{24}$ aralkyl (e.g., $C_6$-$C_{10}$ aralkyl).

Representative alkyl groups include but are not limited to methyl, ethyl, propyl, isopropyl, butyl, isobutyl, sec-butyl, tert-butyl, pentyl, neopentyl, hexyl, heptyl, octyl, nonyl and decyl. Representative alkenyl groups include but are not limited to vinyl, allyl and propenyl. Representative alkynyl groups include but are not limited to ethynyl, 1-propynyl, 2-propynyl, 1-butynyl, and 2-butynyl. Representative cycloalkyl groups include but are not limited to cyclopropyl, cyclobutyl, cyclopentyl, cyclohexyl, and cyclooctyl substituents. Representative heterocycloalkyl groups include but are not limited to tetrahydrofuranyl, tetrahydropyranyl and piperidinyl. Representative aryl groups include but are not limited to phenyl, naphthyl, and triptycene. Representative heteroaryl groups include but are not limited to furanyl, pyranyl and pyridinyl. Representative aralkyl groups include but are not limited to benzyl, and phenethyl.

The term "cycloalkyl" as used herein also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "substituted hydrocarbyl" as used herein means a hydrocarbyl group in which at least one hydrogen thereof has been substituted with a group that is other than hydrogen, such as, but not limited to, halo groups, hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (e.g., alkyl, alkenyl, alkynyl, cycloalkyl, heterocycloalkyl, aryl, heteroaryl, and aralkyl groups), and amine groups, such as —N($R_{11}'$)($R_{12}'$) where $R_{11}'$ and $R_{12}'$ are each independently selected from hydrogen, hydrocarbyl and substituted hydrocarbyl.

The term "substituted hydrocarbyl" is inclusive of halohydrocarbyl (or halo substituted hydrocarbyl) substituents. The term "halohydrocarbyl" as used herein, and similar terms, such as halo substituted hydrocarbyl, means that at least one hydrogen atom of the hydrocarbyl (e.g., of the alkyl, alkenyl, alkynyl, cycloalkyl, heterocycloalkyl, aryl, heteroaryl, and aralkyl groups) is replaced with a halogen atom selected from chlorine, bromine, fluorine and iodine. The degree of halogenation can range from at least one hydrogen atom but less than all hydrogen atoms being replaced by a halogen atom (e.g., a fluoromethyl group), to full halogenation (perhalogenation) in which all replaceable hydrogen atoms on the hydrocarbyl group have each been replaced by a halogen atom (e.g., trifluoromethyl or perfluoromethyl). Correspondingly, the term "perhalohydrocarbyl group" as used herein means a hydrocarbyl group in which all replaceable hydrogens have been replaced with a halogen. Examples of perhalohydrocarbyl groups include, but are not limited to, perhalogenated phenyl groups and perhalogenated alkyl groups.

The hydrocarbyl and substituted hydrocarbyl groups from which the various groups described herein can each be independently selected, such as, but not limited to, $R_1$-$R_{10}$, $R^{11}$, and $R^{12}$ can in each case be independently and optionally interrupted with at least one of —O—, —S—, —C(O)—, —C(O)O—, —OC(O)O—, —S(O)—, —SO$_2$—, —N($R^{11}$)— and —Si($R^{11}$)($R^{12}$)—. As used herein, by interrupted with at least one of —O—, —S—, —C(O)—, —C(O)O—, —OC(O)O—, (O)—, —SO$_2$—, ($R^{11}$)—, and —Si($R^{11}$)($R^{12}$)—, means that at least one carbon of, but less than all of the carbons of, the hydrocarbyl group or substituted hydrocarbyl group, is in each case independently replaced with one of the recited divalent non-carbon linking groups. The hydrocarbyl and substituted hydrocarbyl groups can be interrupted with two or more of the above recited linking groups, which can be adjacent to each other or separated by one or more carbons. For purposes of non-limiting illustration, a combination of adjacent —C(O)— and —N($R^{11}$)— can provide a divalent amide linking or interrupting group, —C(O)—N($R^{11}$)—. For purposes of further non-limiting illustration, a combination of adjacent —N($R^{11}$)—, —C(O)— and —O— can provide a divalent carbamate (or urethane) linking or interrupting group, —N($R^{11}$)—C(O)—O—, where $R^{11}$ is hydrogen.

As used herein, the term "mechanachromic" and similar terms, such as "mechanochromic compound" means having an absorption spectrum for at least visible radiation that varies in response to mechanical stress. Further, as used herein the term "mechanochromic material" means any substance that is adapted to display mechanochromic properties (such as, adapted to have an absorption spectrum for at least visible radiation that varies in response to mechanical stress) and which includes at least one mechanochromic compound, at least one polymer, and/or a polymer composition according to the present invention.

The mechanochromic compounds, materials, polymers, polymer compositions, and articles of the present invention are, with some embodiments, capable of converting from a first state, for example a "clear state," to a second state, for example a "colored state," in response to mechanical stress. With some embodiments of the present invention, the mechanochromic compounds, materials, polymers, polymer compositions, and articles of the present invention undergo minimal, or are substantially free of, reversion back to the previous state (such as a clear state) after exposure to and optional removal of the mechanical stress.

As used herein to modify the term "state," the terms "first" and "second" are not intended to refer to any particular order or chronology, but instead refer to two different conditions or properties. For purposes of non-limiting illustration, the first state and the second state of a mechanochromic compounds, polymers, polymer compositions, and articles of the present invention can differ with respect to at least one optical property, such as but not limited to the absorption of visible and/or UV radiation. Thus, according to various non-limiting embodiments disclosed herein, the mechanochromic compounds, polymers, polymer compositions, and articles of the present invention can have a different absorption spectrum in each of the first and second state. For example, while not limiting herein, a mechanochromic compounds, polymers, polymer compositions, and articles of the present invention can be clear in the first state and colored in the second state. Alternatively, mechanochromic compounds, polymers, polymer compositions, and articles of the present invention can have a first color in the first state and a second color in the second state.

As used herein, the term "actinic radiation" means electromagnetic radiation that is capable of causing a response in a material, such as, but not limited to, transforming a photochromic material from one form or state to another state, or initiating polymerization.

As used herein the term "film" means a preformed layer having a generally uniform thickness that is not capable of self-support.

As used herein the term "sheet" means a pre-formed layer having a generally uniform thickness that is capable of self-support.

As used herein the term "coating" means a supported film derived from a flowable composition, which can have a uniform thickness or non-uniform thickness, and specifically excludes polymeric sheets and unsupported polymer films. A coating that includes one or more mechanochromic polymers or compositions of the present invention can, with some embodiments, be a mechanochromic coating.

The polymers of the present invention can, with some embodiments, be selected from linear polymers, branched polymers, star polymers, graft polymers, and mixtures thereof. Linear polymers are prepared, with some embodiments, from difunctional monomers and difunctional mechanochromic compounds represented by Formula (II) and/or (III). Branched polymers can be prepared in accordance with art-recognized methods, in which monomers having a functionality of greater than 2, and/or mechanochromic compounds represented by Formula (II) and/or (III) having a functionality of greater than 2 are used.

The polymers of the polymer compositions of the present invention include at least one polymer chain segment represented by Formula (I) as described above. The polymer segment represented by Formula (I) can represent one or more segments that comprise (or form/define) at least a portion of the chain, or backbone, architecture of the polymer. With some embodiments the polymer chain segment represented by Formula (I) is located in at least one of: the backbone of the polymer; one or more branches of the polymer (when the polymer is branched); and one or more arms of the polymer (when the polymer has star or comb architecture).

With some embodiments, the polymer includes at least one polymer chain segment represented by Formula (I), such as 1 to 100, or 1 to 50, or 1 to 30, or 1 to 20, or 1 to 10, or 1 to 5, or 1 to 3 polymer chain segments represented by Formula (I). Correspondingly, the polymer, in accordance with some embodiments, includes at least one residue of a mechanochromic compound represented by Formula (II) and/or (III), such as 1 to 100, or 1 to 50, or 1 to 30, or 1 to 20, or 1 to 10, or 1 to 5, or 1 to 3 residues of a mechanochromic compound represented by Formula (II) and/or (III). In accordance with some embodiments, the polymer includes 1 or 2 polymer chain segments represented by Formula (I). In further accordance with the some embodiments, the polymer includes 1 or 2 residues of a mechanochromic compound represented by Formula (II) and/or (III).

In accordance with some embodiments, the polymer chain segment represented by Formula (I) substantially defines the polymer, and is represented by the following Formula (I-A),

(I-A)

With reference to Formula (I-A), φ, M, w, and z are each as defined with reference to Formula (I) herein, such as previously herein. With further reference to Formula (I-A), E independently for each z is an end group or terminal group. With some embodiments, E is selected from hydrogen, a monomer residue M, hydrocarbyl and substituted hydrocarbyl each, optionally interrupted with at least one of —O—, —S—, —C(O)—, —C(O)O—, —OC(O)O—, —S(O)—, —SO$_2$—, —N(R$^{11}$)—, and —Si(R$^{11}$)(R$^{12}$)— wherein R$^{11}$ and R$^{12}$ are each independently selected from hydrogen, hydrocarbyl and substituted hydrocarbyl and combinations of two or more thereof.

Each end group E of the polymer represented by Formula (I-A), with some embodiments, is an active hydrogen group independently selected from hydroxyl, thiol, carboxylic, acid, primary amine, and secondary amine. With some additional embodiments, each end group E is a group that is reactive with active hydrogen groups, such as, but not limited to, oxirane, thiooxirane, isocyanate, thioisocyanate, cyclic carbonate, cyclic carboxylic add ester, carboxylic acid anhydride, cyclic carboxylic add anhydride, and cyclic amide.

Each end group E, with some further embodiments, independently is or includes a radically polymerizable ethylenically unsaturated group, such as, but not limited to, a (meth) acryloyl group and an allylic group. When the polymers of the present invention include radically polymerizable ethylenically unsaturated groups, the polymer compositions of the present invention can be cured by exposure to actinic radiation in the presence of a suitable initiator, such as a photopolmerization initiator, and an optional crosslinking agent that has two or more radically polymerizable ethylenically unsaturated groups, in accordance with art-recognized methods.

With some embodiments, the allylic group, from which each E can be independently selected, can be a substituted and/or unsubstituted allylic group, such as one or more radicals represented by the following Formula (VII),

(VII)

With reference to Formula (VII), R$^1$ is hydrogen, halogen or a C$_1$ to C$_4$ alkyl group. With some embodiments, R$^1$ is hydrogen or methyl and Formula (VII) represents a (meth) allyl radical.

The spirooxazine represented by Formula (II), with some embodiments, includes at least one first reactive group, and at least one second reactive group. In further accordance with some embodiments, for the spirooxazine represented by Formula (II): at least one of R$_1$ independently for each n, and R$_2$ independently for each p, independently include the first reactive group; and at least one of R$_3$ independently for each q, R$_4$, R$_5$ and R$_6$ independently include the second reactive group. Each first reactive group and each second reactive group can be the same or different.

While not intending to be bound by any theory, and with reference to Formula (II), it is believed based on the evidence at hand that the spirooxazine compound of the present invention, with some embodiments, is converted from a first state (which can be visibly non-colored) to a second state (which can be visibly colored) when bond (a') between ring positions 3 and 4' is broken. As such, and with some embodiments, when the spirooxazine represented by Formula (I) includes at least one first reactive group and at least one second reactive group, each first reactive group is positioned so as to be on one side of the spirooxazine relative to bond (a') (at least one R$_1$ and/or at least one R$_2$ each independently including a first reactive group), and each second reactive group is positioned so as to be on the other side of the spirooxazine relative to bond (a') (at least one R$_3$, and/or R$_4$, and/or R$_5$, and/or R$_6$ each independently include a second reactive group).

The indenonaphthopyran represented by Formula (III), with some embodiments includes at least one first reactive group, and at least one second reactive group. In further accordance with some embodiments, for the indenonaphthopyran represented by Formula (III): at least one of B and B' independently include the first reactive group; and at least one of R$_7$ independently for each x, R$_8$ independently for each y, R$_9$ and R$_{10}$ independently include the second reactive group.

While not intending to be bound by any theory, and with reference to Formula (III), it is believed based on the evidence at hand that the indenonaphthopyran compound of the present invention, with some embodiments, is converted from a first state (which can be visibly non-colored) to a second state (which can be visibly colored) when bond (a) between ring positions 3 and 4 is broken. As such, and with some embodiments, when the indenonaphthopyran represented by Formula (III) includes at least one first reactive group and at least one second reactive group, each first reactive group is positioned so as to be on one side of the indenonaphthopyran relative to bond (a) (B and/or B' each independently including a first reactive group), and each second reactive group is positioned so as to be on the other side of the indenonaphthopyran relative to bond (a) (at least one $R_7$, and/or at least one $R_8$, and/or $R_9$, and/or $R_{10}$ each independently include a second reactive group).

In accordance with some embodiments, z of Formula (I) is 2, and the spirooxazine represented by Formula (II) includes one (a single) first reactive group, and one (a single) second reactive group. In further accordance with some embodiments, for the spirooxazine represented by Formula (II): one of $R_1$ and $R_2$, independently include the first reactive group; and one of $R_3$, $R_4$, $R_5$ and $R_9$ include the second reactive group.

Subscript z of Formula (I), with some embodiments, is 2, and the indenonaphthopyran represented by Formula (III) includes one (a single) first reactive group, and one (a single) second reactive group. In further accordance with some embodiments, for the indenonaphthopyran represented by Formula (III): one of B and B' include the first reactive group; and one of $R_7$, $R_8$, $R_9$ and $R_{10}$ include the second reactive group.

Subscript z of Formula (I), with some further embodiments, is 2, and the spirooxazine represented by Formula (II) includes one (a single) first reactive group, and one (a single) second reactive group. In further accordance with such non-limiting embodiments, for the spirooxazine represented by Formula (II): one $R_2$ includes the first reactive group; and one $R_3$ includes the second reactive group. The $R_2$ group of the spirooxazine represented by Formula (II) that includes the one (or only) first reactive group is located at ring position 5' thereof, and the $R_3$ group of the spirooxazine represented by Formula (II) that includes the one (or only) second reactive group is located at ring position 5 thereof, with some embodiments.

Subscript z of Formula (I), with some further embodiments, is 2, and the indenonaphthopyran represented by Formula (III) includes one (a single) first reactive group, and one (a single) second reactive group. In further accordance with such non-limiting embodiments, for the indenonaphthopyran represented by Formula (III): one of B and B' include the first reactive group; and one of $R^7$ and $R_8$ include the second reactive group. The B or B' group of the indenonaphthopyran represented by Formula (III) that includes the one (or only) first reactive group is located at ring position 3 thereof, and $R_8$ includes the one (or only) second reactive group, which is located at ring position 11 of the indenonaphthopyran represented by Formula (III), with some embodiments.

The reactive groups of each mechanochromic compound of the polymers of the present invention are each independently selected from active hydrogen groups, and groups that are reactive with active hydrogen groups, with some embodiments. The reactive groups allow the mechanochromic groups to react with two or more monomers, such that the mechanochromic compound becomes incorporated into a polymer chain segment of the polymer, such as represented by Formula (I).

The active hydrogen groups of each mechanochromic compound of the polymers of the present invention are each independently selected from hydroxyl, thiol, primary amine, secondary amine, and carboxylic acid, with some embodiments. The groups that are reactive with active hydrogen groups, of each mechanochromic compound of the polymer of the present invention, are each independently selected from carboxylic acid halides, cyclic carboxylic acid anhydrides, oxiranes, thiooxiranes, isocyanates, thioisocyanates, cyclic carboxylic, acid esters, cyclic amides, and cyclic carbonates, with some embodiments.

Each monomer from which the polymers of the present invention are prepared independently include at least one monomer reactive group selected from active hydrogen groups, and groups that are reactive with active hydrogen groups. The monomer reactive groups allow the at least two monomers to react with and become covalently bonded with a mechanochromic compound, such as represented by Formulas (II) and (III). In addition, the monomer reactive groups allow the monomers to react and polymerize with each other so as to form the polymers of the present invention.

With some embodiments, each active hydrogen group of each monomer is independently selected from hydroxyl, thiol, primary amine, secondary amine, and carboxylic acid. With some further embodiments, each group that is reactive with active hydrogen groups, of each monomer, is independently selected from carboxylic acid halides, cyclic carboxylic acid anhydrides, oxiranes, thiooxiranes, isocyanates, thioisocyanates, cyclic carboxylic acid esters, cyclic amides, and cyclic carbonates.

The polymer of the present invention, which can be part of a polymer composition with some embodiments, is selected from polyester polymers, polyurethane polymers, polycarbonate polymers, polyether polymers, polyamide polymers, polyimide polymers, polyamideimide polymers, polyurea polymers, polysulfone polymers, polyketone polymers, and combinations of two or more thereof. The polymers of the present invention can, with some embodiments, be prepared from art-recognized monomers and in accordance with art-recognized methods.

Polyester polymers of the present invention, can be prepared, with some embodiments, by art-recognized methods, which include reacting carboxylic acid functional materials or their anhydrides) having acid functionalities of at least 2, and polyols having hydroxy functionalities of at least 2. The molar equivalents ratio of carboxylic acid groups to hydroxy groups of the reactants is selected such that the resulting polyester has hydroxyl functionality and/or carboxylic acid functionality, and a desired molecular weight.

Examples of multifunctional carboxylic acids useful in preparing polyester polymers include, but are not limited to, benzene-1,2,4-tricarboxylic acid, phthalic acid, tetrahydrophthalic acid, hexahydrophthalic acid, endobicyclo-2,2,1,5-heptyne-2,3-dicarboxylic acid, tetrachlorophthalic acid, cyclohexanedloic acid, succinic acid, isophthalic acid, terephthalic acid, azelaic acid, maleic acid, trimesic acid, 3,6-dichlorophthalic acid, adipic acid, sebacic acid, and like multifunctional carboxylic acids.

Examples of polyols useful in preparing polyester polymers include, but are not limited to glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethyloicyclohexane, 2,2,4-trimethylpentane dial, 4,4'-(propane-2,2-diyl)diphenol, 4,4'-methylenediphenol, and like polyols.

Polyester polymers of the present invention, that include a residue of at least one mechanochromic compound, such as represented by Formula (II) and/or (III) have an Mn of less than or equal to 10,000, such as from 1,000 to 10,000, or from 2,000 to 7,000, with some embodiments. The equivalent weight (such as hydroxyl or carboxylic acid equivalent weight) of the polyester polymers is, with some embodiments, less than or equal to 3000 grams/equivalent, such as from 300 to 2,000 grams/equivalent.

Polyether polymers of the present invention, can be prepared in accordance with art-recognized methods. With some embodiments the polyether polymers can be prepared from polyols having two or more hydroxy groups and polyepoxides having two or more epoxide (or oxirane) groups, which are reacted in proportions such that the resulting polyether has hydroxy functionality and/or oxirane functionality. The polyols and polyepoxides used in the preparation of the epoxide functional polyether can be selected from, for example, aliphatic, cycloaliphatic and aromatic polyols and polyepoxides, and mixtures thereof. Specific examples of polyols include those recited previously herein. Polyepoxides useful in preparing polyether polymers include, with some embodiments, those resulting from the reaction of a polyol and epichlorohydrin. With some embodiments, one or more of the polyols recited previously herein can be reacted with epichlorohydrin, so as to result in the formation of a polyepoxide. For purposes of non-limiting illustration, the polyether polymer can be prepared, with some embodiments, from: 4,4'-(propane-2,2-diyl)diphenol and the diglycidyl ether of 4,4'-(propane-2,2-diyl)diphenol; or 4,4'-(propane-2,2-diyl) dicylcohexanol and the diglycidyl ether of 4,4'-(propane-2,2-diyl)dicylcohexanol.

The polyether polymers of the present invention, with some embodiments, can have a Mn of less than 10,000, such as from 1,000 and 7,000. The equivalent weight (such as hydroxyl or epoxide equivalent weight) of the polyether polymers is, with some embodiments, less than or equal to 3,000 grams/equivalent, such as from 300 and 2,000 grams/equivalent.

The polyurethane polymers of the present invention can be prepared in accordance with art-recognized methods, such as by reaction of a polyisocyanate having at least two isocyanate groups, with a polyol having at least two hydroxy groups, with: an appropriate molar excess of hydroxyl groups, so as to form a hydroxyl functional polyurethane having at least 2 hydroxyl groups; or an appropriate molar excess of isocyanate groups so as to form a polyurethane having at least 2 isocyanate groups. Examples of polyisocyanates useful in the preparation of polyurethane polymers include, with some embodiments, aliphatic, aromatic, cycloaliphatic and heterocyclic polyisocyanates, and mixtures of such polyisocyanates.

Further examples of polyisocyanates useful in the preparation of polyurethane polymers include, but are not limited to, toluene-2,4-diisocyanate; toluene-2,6-diisocyanate; diphenyl methane-4,4-diisocyanate; diphenyl methane-2,4'-diisocyanate; para-phenylene diisocyanate; biphenyl diisocyanate; 3,3'-dimethyl-4,4"-diphenylene diisocyanate; tetramethylene-1,4-diisocyanate; hexamethylene-1,6-diisocyanate; 2,2,4-trimethyl hexane-1,6-dilsocyanate; lysine methyl ester diisocyanate; bis(isocyanato ethyl)fumarate; isophorone diisocyanate; ethylene diisocyanate; dodecane-1,12-diisocyanate; cyclobutane-1,3-dilsocyanate; cyclohexane-1,3-dilsocyanate; cyclohexane-1,4-dilsocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-dilsocyanate; perhydrodiphenylmethane-2,4'-diisocyanate; perhydrodiphenylmethane-4,4'-diisocyanate and mixtures thereof.

Examples to polyols having at least two hydroxyl groups, from which the polyurethane polymers of the present invention can be prepared, include, but are not limited to those polyols recited previously herein.

The polyurethane polymers of the present invention can have a Mn of less than 10,000, such as from 100 and 7,000. The equivalent weight (such as hydroxyl or isocyanate equivalent weight) of the polyurethane polymers of the present invention is, with some embodiments, less than or equal to 3,000 grams/equivalent, such as from 100 to 2,000 grams/equivalent.

The polycarbonate polymers of the present invention can be prepared in accordance with art-recognized methods. With some embodiments, the polycarbonate polymers are prepared from the reaction of a polyol, such as a diol, with a carbonyl dihalide, such as carbonyl dichloride, with removal of the resulting halide acid. Examples to polyols having at least two hydroxyl groups, from which the polycarbonate polymers of the present invention can be prepared, include, but are not limited to those polyols recited previously herein. The polycarbonate polymers can have hydroxyl functionality, or can be further reacted in accordance with art-recognized methods, so as to have functionality other thane hydroxyl functionality, such as, but not limited to, oxirane functionality and cyclic carbonate functionality.

The polycarbonate polymers of the present invention, with some embodiments, can have a Mn of less than 10,000, such as from 1,000 and 7,000. The equivalent weight (such as hydroxyl equivalent weight, or oxirane equivalent weight, or cyclic carbonate equivalent weight) of the polycarbonate polymers is, with some embodiments, less than or equal to 3,000 grams/equivalent, such as from 300 and 2,000 grams/equivalent.

The polyamide polymers of the present invention can be prepared in accordance with art-recognized methods. With some embodiments a material having two or more carboxylic acid groups is reacted with a material having two or more primary amine groups, so as to form a polyamide polymer. With some further embodiments, a material having two or more primary amine groups is reacted with a material having two or more carbonyl halide groups. Examples of multifunctional carboxylic acids from which the polyamide polymers can be prepared include, but are not limited to those recited previously herein. Examples of multifunctional carbonyl halides from which the polyamide polymers can be prepared include, but are not limited to those multifunctional carboxylic acids recited previously herein, in which the carboxylic acid groups are replaced with carbonyl halide groups.

Amines from which the polyamide polymers can be prepared include, but are not limited to, aliphatic amines, cycloaliphatic amines, heterocycloaliphatic amines, aromatic amines, and heteroaromatic amines. Additional examples of amines from which the polyamide polymers can be prepared include, but are not limited to, diaminocyclohexane, 4,4'-methylenedi(cyclohexylamine), 4,4'-(propane-2,2-diyl)dicyclohexanamine, 3,3' dimethyl-methylenedi(cyclohexylamine), 4,4'-(propene-2,2-diyl)dianiline, 4,4'-methylenedianiline, piperazine, N-amino ethyl piperazine, aminomethyl-1,3,3-trimethyl-cyclohexane, diamino ethane, diamino propane, diaminobutane, diaminopentane, diaminohexane, diaminoheptane, diaminooctane, diaminodecane, diaminoundecane, diaminododecane, dicyanamide, 4,4' diaminodiphenyl sulfone, and melamine.

The polyamide polymers of the present invention, with some embodiments, can have a Mn of less than 10,000, such as from 1,000 and 7,000. The equivalent weight (such as amine equivalent weight, or carboxylic acid equivalent weight) of the polyamide polymers is, with some embodiments, less than or equal to 3.000 grams/equivalent, such as from 300 and 2,000 grams/equivalent.

The polyimide polymers of the present invention can be prepared by art-recognized methods. With some embodiments, the polyimide polymers are prepared by reaction of a multifunctional carboxylic anhydride, such as a bis-anhydride, and a multifunctional amine, such as a diamine. Examples of multifunctional anhydrides from which the polyimide polymers can be prepared include, but are not limited to, pyromellitic dianhydride and naphthalene tetracarboxylic dianhydride. Examples of multifunctional amines from which the polyimide polymers can be prepared include, but are not limited to, those amines recited previously herein. The polyimide polymers can have any suitable functionality, such as amine functionality or anhydride functionality.

The polyimide polymers of the present invention, with some embodiments, can have a Mn of less than 10,000, such as from 1,000 and 7,000. The equivalent weight (such as amine equivalent weight, or anhydride equivalent weight) of the polyimide polymers is, with some embodiments, less than or equal to 3,000 grams/equivalent, such as from 300 and 2,000 grams/equivalent.

The polyamideimide polymers of the present invention can be prepared by art-recognized methods. With some embodiments, the polyamideimide polymers are prepared by reaction of a multifunctional amine with a material having both one or more carbonyl halide groups and one or more carboxylic acid anhydride groups, such as, but not limited to a trimellitic acid halide. Multifunctional amines from which the polyamideimide polymers can be prepared include, but are not limited to, those recited previously herein.

The polyamideimide polymers of the present invention, with some embodiments, can have a Mn of less than 10,000, such as from 1,000 and 7,000. The equivalent weight (such as amine equivalent weight, or anhydride equivalent weight) of the polyamideimide polymers is, with some embodiments, less than or equal to 3,000 grams/equivalent, such as from 300 and 2,000 grams/equivalent.

The polyurea polymers of the present invention can be prepared by art-recognized methods. With some embodiments, the polyurea polymers are prepared by reaction of a multifunctional amine with a multifunctional isocyanate. Examples of multifunctional amines from which the polyurea polymers can be prepared include, but are not limited to, those recited previously herein. Examples of multifunctional isocyanates from which the polyurea polymers can be prepared include, but are not limited to, those recited previously herein.

The polyurea polymers of the present invention, with some embodiments, can have a Mn of less than 10,000, such as from 1,000 and 7,000. The equivalent weight (such as amine equivalent weight, or isocyanate equivalent weight) of the polyurea polymers is, with some embodiments, less than or equal to 3,000 grams/equivalent, such as from 300 and 2,000 grams/equivalent.

The polysulfone polymers of the present invention can be prepared by art-recognized methods. With some embodiments, the polysulfone polymers are prepared by reaction of a polyol, such as a diol, with a bis(halo-hydrocarbyl)sulfone, such as bis(4-halophenyl)sulfone, such as bis(4-chlorophenyl)sulfone. Examples of polyols from which the polysulfone polymers can be prepared include, but are not limited to, those polyols recited previously herein. With some embodiments, the polyol from which the polysulfone polymers can be prepared is selected from 4,4"-(propane-2,2-diyl)diphenol and 4,4'-methylenediphenol.

The polysulfone polymers of the present invention, with some embodiments, can have a Mn of less than 10,000, such as from 1,000 and 7,000. The equivalent weight (such as hydroxyl equivalent weight) of the polysulfone polymers is, with some embodiments, less than or equal to 3,000 grams equivalent, such as from 300 and 2,000 grams/equivalent.

The polyketone polymers of the present invention can be prepared by art-recognized methods. With some embodiments, the polyketone polymers are prepared by reaction of an olefin, such as ethylene and optionally propylene, with carbon dioxide in the presence of a suitable catalyst, such as a palladium catalyst, such as palladium(II)-phenanthroline. The polyketone polymers of the present invention, with some embodiments, can have a Mn of less than 10,000, such as from 1,000 and 7,000.

With the spirooxazine compound of the present invention as represented by Formula (II), and in accordance with some embodiments, $R_1$ independently for each n and $R_2$ independently for each p are each independently selected from hydrogen, aryl, mono($C_1$-$C_6$)alkoxyaryl, di($C_1$-$C_6$)alkoxyaryl, mono($C_1$-$C_6$)alkylaryl, di($C_1$-$C_6$)alkylaryl, bromoaryl, chloroaryl, fluoroaryl, $C_3$-$C_7$cycloalkylaryl, $C_3$-$C_7$ cycloalkyl, $C_3$-$C_7$ cycloalkyloxy, $C_3$-$C_7$cycloalkyloxy($C_1$-$C_6$)alkyl, $C_3$-$C_7$ cycloalkyloxy($C_1$-$C_6$)alkoxy, aryl($C_1$-$C_6$)alkyl, aryl($C_1$-$C_6$)alkoxy, aryloxy, aryloxy($C_1$-$C_6$)alkyl, aryloxy($C_1$-$C_6$)alkoxy, mono- or di($C_1$-$C_6$)alkylaryl($C_1$-$C_6$)alkyl, mono- or di($C_1$-$C_6$)alkoxyaryl($C_1$-$C_6$)alkyl, mono- or di($C_1$-$C_6$) alkylaryl($C_1$-$C_6$)alkoxy, mono- or di($C_1$-$C_6$)alkoxyaryl($C_1$-$C_6$)alkoxy, amino, mono($C_1$-$C_6$)alkylamino, di($C_1$-$C_6$)alkylamino, diarylamino, N—($C_1$-$C_6$)alkylpiperazino, N-arylpiperazino, aziridino, indolino, piperidino, arylpiperidino, morpholino, thiomorpholino, tetrahydroquinolino, tetrahydroisoquinolino, pyrryl, $C_1$-$C_6$ alkyl, $C_1$-$C_6$ bromoalkyl, $C_1$-$C_6$ chloroalkyl, $C_1$-$C_6$-fluoroalkyl, $C_1$-$C_6$ alkoxy, mono($C_1$-$C_6$)alkoxy($C_1$-$C_4$)alkyl, acryloxy, methacryloxy, acyloxy($C_1$-$C_6$ alkyl), acyloxy($C_3$-$C_7$ cycloalkyl), acyloxy(aryl), bromo, chloro or fluoro.

In accordance with some embodiments of the present invention, $R_3$ of the spirooxazine represented by Formula (II) is, independently for each q, chosen from hydrogen, $C_1$-$C_5$ alkyl, $C_1$-$C_5$ alkoxy, nitro, cyano, $C_1$-$C_8$ alkoxycarbonyl, acyloxy($C_1$-$C_6$ alkyl), acyloxy($C_3$-$C_7$ cycloalkyl), acyloxy(aryl), halo, $C_1$-$C_4$ monohaloalkyl or $C_1$-$C_4$ polyhaloalkyl; said halo substituents being chloro, fluoro, iodo or bromo.

In accordance with some embodiments of the present invention, $R_4$ of the spirooxazine represented by Formula (II) is, chosen from hydrogen, $C_1$-$C_8$ alkyl, $C_3$-$C_7$ cycloalkyl, phen($C_1$-$C_4$)alkyl, naphth($C_1$-$C_4$)alkyl, allyl acryloyloxy ($C_2$-$C_6$)alkyl, methacrylyloxy($C_2$-$C_6$)alkyl, $C_2$-$C_4$ acyloxy ($C_2$-$C_6$)alkyl, carboxy($C_2$-$C_6$)alkyl, cyano($C_2$-$C_6$)alkyl, hydroxy($C_2$-$C_6$)alkyl, triarylsilyl, triarylsilyloxy, tri($C_1$-$C_8$) alkylsilyl, tri($C_1$-$C_6$)alkylsilyloxy, tri($C_1$-$C_6$)alkoxysilyl, tri ($C_1$-$C_6$)alkoxy)silyloxy, di($C_1$-$C_5$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ di($C_1$-$C_6$)alkoxy($C_1$-$C_6$ alkyl)silyloxy, $C_1$-$C_6$ alkoxy($C_7$-$C_4$)alkyl or ($C_2$-$C_4$O)$_r$CH$_3$, wherein r is an integer from 1 to 6.

With some embodiments, $R_5$ and $R_6$ of the spirooxazine represented by Formula (I) are each independently selected from hydrogen, $C_1$-$C_5$ alkyl, acyloxy($C_1$-$C_6$ alkyl), acyloxy ($C_3$-$C_7$ cycloalkyl), acyloxy(aryl), benzyl, phenyl, mono- or di-substituted phenyl, said phenyl substituents being $C_1$-$C_5$ alkyl or $C_1$-$C_5$ alkoxy; or $R_5$ and $R_6$ taken together form a group chosen from a cyclic ring of from 5 to 8 carbon atoms which includes the spiro carbon atom.

With the spirooxazine compound of the present invention as represented by Formula (II), and in accordance with some embodiments, $R_1$ independently for each n and $R_2$ independently for each p are each independently selected from hydrogen, aryl, mono($C_1$-$C_6$)alkoxyaryl, di($C_1$-$C_6$)alkylamino, piperidino, morpholino, $C_1$-$C_6$ alkoxy, or fluoro.

In accordance with some embodiments of the present invention, $R_3$ of the spirooxazine represented by Formula (II) is, independently for each q, selected from hydrogen, $C_1$-$C_5$ alkyl, $C_1$-$C_5$ alkoxy, $C_1$-$C_5$ alkoxycarbonyl, acyloxy($C_1$-$C_6$ alkyl), acyloxy($C_3$-$C_7$ cycloalkyl), acyloxy(aryl), halo, $C_1$-$C_4$ monohaloalkyl or $C_1$-$C_4$ polyhaloalkyl; and said halo substituents being chloro or fluoro.

In accordance with some further embodiments of the present invention, $R_4$ of the spirooxazine represented by Formula (II) is, is selected from hydrogen, $C_1$-$C_8$ alkyl, phen($C_1$-$C_4$)alkyl, acrylyloxy($C_2$-$C_6$)alkyl, methacrylyloxy($C_2$-$C_6$)alkyl, carboxy($C_2$-$C_6$)alkyl, tri($C_1$-$C_5$)alkylsilyl, tri($C_1$-$C_5$)alkylsilyloxy, tri($C_1$-$C_5$)alkoxysilyl, tri($C_1$-$C_6$)alkoxysilyloxy, di($C_1$-$C_6$)alkyl($C_1$-$C_6$alkoxy)silyl, di($C_1$-$C_5$)alkyl($C_1$-$C_6$ alkoxy)silyloxy, di($C_1$-$C_6$)alkoxy($C_1$-$C_6$ alkyl) silyl or di($C_1$-$C_6$)alkoxy($C_1$-$C_6$ alkyl)silyloxy.

In accordance with some additional embodiments of the present invention, $R_5$ and $R_6$ are each independently selected from hydrogen, $C_1$-$C_5$ alkyl, phenyl; or $R_5$ and $R_6$ taken together form a group chosen from a cyclic ring of from 5 to 8 carbon atoms which includes the spiro carbon atom.

For the indenonaphthopyran represented by Formula (III), and in accordance with some embodiments, $R_7$ independently for each x and $R_8$ independently for each y are each independently selected from: hydrogen; a compatiblizing substituent; halogen selected from fluoro and chloro; $C_1$-$C_{20}$ alkyl; $C_3$-$C_{10}$ cycloalkyl; acyloxy($C_1$-$C_6$ alkyl), acyloxy($C_3$-$C_7$ cycloalkyl), acyloxy(aryl); substituted or unsubstituted phenyl, the phenyl substituents being selected from hydroxyl, halogen, carbonyl, $C_1$-$C_{20}$ alkoxycarbonyl, cyano, halo($C_1$-$C_{20}$)alkyl, $C_1$-$C_{20}$ alkyl or $C_1$-$C_{20}$ alkoxy; —O—$R_{10}$' or —C(O)—$R_{10}$' or —C(O)—O$R_{10}$', wherein $R_{10}$' is hydrogen, $C_1$-$C_{20}$ alkyl, phenyl($C_1$-$C_{20}$)alkyl, mono($C_1$-$C_{20}$)alkyl substituted phenyl($C_1$-$C_{20}$)alkyl, mono($C_1$-$C_{20}$)alkoxy substituted phenyl($C_1$-$C_{20}$)alkyl, ($C_1$-$C_{20}$)alkoxy($C_2$-$C_{20}$)alkyl, $C_3$-$C_{10}$ cycloalkyl, or mono($C_1$-$C_{20}$)alkyl substituted $C_3$-$C_{10}$ cycloalkyl; —N($R_{11}$')$R_{12}$', wherein $R_{11}$' and $R_{12}$' are each independently hydrogen, $C_1$-$C_{20}$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_{20}$ alkylaryl, $C_3$-$C_{10}$ cycloalkyl, $C_4$-$C_{20}$ bicycloalkyl, $C_5$-$C_{20}$ tricycloalkyl or $C_1$-$C_{20}$ alkoxyalkyl, wherein said aryl group is phenyl or naphthyl, or $R_{11}$' and $R_{12}$' come together with the nitrogen atom to form a $C_3$-$C_{20}$ hetero-bicycloalkyl ring or a $C_4$-$C_{20}$ hetero-tricycloalkyl ring.

For the indenonaphthopyran represented by Formula (III), and in accordance with some further embodiments, $R_7$ independently for each x and $R_8$ independently for each y are each independently selected from a nitrogen containing ring represented by the following graphic Formula (IVA),

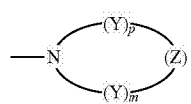

(IVA)

With reference to Formula (IVA), each —Y— is independently chosen for each occurrence from —CH$_2$—, —CH($R_{13}$')—, —C($R_{13}$')$_2$—, —CH(aryl)-, —C(aryl)$_2$-, and —C($R_{13}$')(aryl)-, and Z is —Y—, —O—, —S—, —S(O)—, —SO$_2$—, —NH—, —N($R_{13}$')—, or —N(aryl)-, wherein each $R_{13}$' is independently $C_1$-$C_{20}$ alkyl, each aryl is independently phenyl or naphthyl, m is an integer 1, 2 or 3, and p is an integer 0, 1, 2, or 3 and provided that when p is 0, Z is —Y—.

For the indenonaphthopyran represented by Formula (III), and in accordance with some further embodiments, $R_7$ independently for each x and $R_8$ independently for each y are each independently selected from a group represented by one of the following graphic Formulas (IVB) or (IVC):

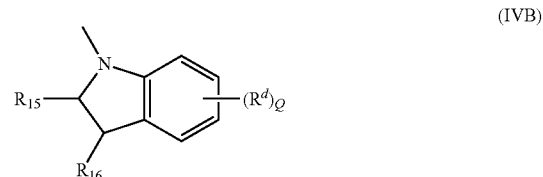

(IVB)

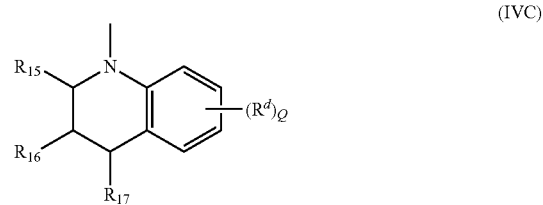

(IVC)

With reference to Formulas (NB) and (IVC), $R_{15}$, $R_{16}$, and $R_{17}$ are each independently hydrogen, $C_1$-$C_6$ alkyl, phenyl, or naphthyl, or the groups $R_{15}$ and $R_{16}$ together form a ring of 5 to 8 carbon atoms and each $R^d$ is independently for each occurrence selected from $C_1$-$C_{20}$ alkyl, $C_1$-$C_{20}$ alkoxy, fluoro or chloro, and Q is an integer 0, 1, 2, or 3.

For the indenonaphthopyran represented by Formula (III), and in accordance with some additional embodiments, $R_7$ independently for each x and $R_8$ independently for each y are each independently selected from unsubstituted, mono-, or di-substituted $C_4$-$C_{18}$ spirobicyclic amine, or unsubstituted, mono-, and di-substituted $C_4$-$C_{18}$ spirotricyclic amine, wherein said substituents are independently aryl, $C_1$-$C_{20}$ alkyl, $C_1$-$C_{20}$ alkoxy, or phenyl($C_1$-$C_{20}$)alkyl.

In accordance with some embodiments, and with further reference to the indenonaphthopyran represented by Formula (III), two adjacent $R_7$ groups, or two adjacent $R_3$ groups, independently together form a group represented by one of the following Formulas (IVD) and (IVE);

(IVD)

(IVE)

With reference to Formulas (IVD) and (IVE), T and T' are each independently oxygen or the group —N$R_{11}$'—, where $R_{11}$', $R_{15}$, and $R_{16}$ are as set forth above.

In accordance with some further embodiments, and with further reference to the indenonaphthopyran represented by Formula (III), $R_9$ and $R_{10}$ are each independently selected from the following classes of groups (i) through (v).

With some embodiments, $R_9$ and $R_{10}$ of Formula (III) are each independently selected from (i) hydrogen, $C_1$-$C_{20}$ alkyl, $C_1$-$C_{20}$ haloalkyl, $C_3$-$C_{10}$ cycloalkyl, acyloxy($C_1$-$C_8$ alkyl), acyloxy(C$_3$-C$_7$ cycloalkyl), acyloxy(aryl), allyl, benzyl, or mono-substituted benzyl, said benzyl substituents being chosen from halogen, C$_1$-C$_{20}$ alkyl or C$_1$-C$_{20}$ alkoxy.

With some embodiments, R$_9$ and R$_{10}$ of Formula (III) are each independently selected from, (ii) an unsubstituted, mono- di- or tri-substituted group chosen from phenyl, naphthyl, phenanthryl, pyrenyl, quinolyl, isoquinolyl, benzofuranyl, thienyl, benzothienyl, dibenzofuranyl, dibenzothienyl, carbazolyl, or indolyl, said group substituents in each case being independently chosen from halogen, C$_1$-C$_{20}$ alkyl or C$_1$-C$_{20}$ alkoxy.

With some embodiments, R$_9$ and R$_{10}$ of Formula (III) are each independently selected from, (iii) mono-substituted phenyl, said substituent located at the para position being —(CH$_2$)$_t$— or —O—(CH$_2$)$_t$—, wherein t is the integer 1, 2, 3, 4, 5 or 6, said substituent being connected to an aryl group which is a member of a photochromic material.

With some embodiments, R$_9$ and R$_{10}$ of Formula (II) are each independently selected from, (iv) the group —CH(R$^{18}$)G, wherein R$^{18}$ is hydrogen, C$_1$-C$_6$ alkyl or the unsubstituted, mono- or di-substituted aryl groups phenyl or naphthyl, and G is —CH$_2$OR$^{19}$, wherein R$^{19}$ is hydrogen, —C(O)R$^{10}$, C$_1$-C$_{20}$ alkyl, C$_1$-C$_{20}$ alkoxy(C$_1$-C$_{20}$)alkyl, phenyl(C$_1$-C$_{20}$)alkyl, mono(C$_1$-C$_{20}$)alkoxy substituted phenyl(C$_1$-C$_{20}$)alkyl, or the unsubstituted, mono- or di-substituted aryl groups phenyl or naphthyl, each of said phenyl and naphthyl group substituents being C$_1$-C$_{20}$ alkyl or C$_1$-C$_{20}$ alkoxy.

With some embodiments, (v) R$_9$ and R$_{10}$ together form a spiro substituent selected from a substituted or unsubstituted spiro-carbocyclic ring containing 3 to 6 carbon atoms, a substituted or unsubstituted spiro-heterocyclic ring containing 1 or 2 oxygen atoms and 3 to 6 carbon atoms including the spirocarbon atom, said spiro-carbocyclic ring and spiro-heterocyclic ring being annellated with 0, 1 or 2 benzene rings, said substituents being hydrogen or C$_1$-C$_{20}$ alkyl.

In accordance with some additional embodiments, and with further reference to the indenonaphthopyran represented by Formula (III), B and B' are each independently: an aryl group that is mono-substituted with a compatiblizing substituent; a substituted phenyl; a substituted aryl; a substituted 9-julolindinyl; a substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl, wherein the phenyl, aryl, 9-julolindinyl, or heteroaromatic substituent is a reactive substituent R; an unsubstituted, mono-, di-, or tri-substituted phenyl or aryl group; 9-julolidinyl; or an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl.

The phenyl, aryl and heteroaromatic substituents, from which B and B' can each be independently selected, are in each case independently: hydroxyl, a group —C(=O)R$_{21}$, wherein R$_{21}$ is —OR$_{22}$, —N(R$_{23}$)R$_{24}$, piperidino, or morpholino, wherein R$_{22}$ is allyl, C$_1$-C$_{20}$ alkyl, phenyl, mono(C$_1$-C$_{20}$)alkyl substituted phenyl, mono(C$_1$-C$_{20}$)alkoxy substituted phenyl, phenyl(C$_1$-C$_{20}$)alkyl, mono(C$_1$-C$_{20}$)alkyl substituted phenyl(C$_1$-C$_{20}$)alkyl, mono(C$_1$-C$_{20}$)alkoxy substituted phenyl(C$_1$-C$_{20}$)alkyl, C$_1$-C$_{20}$ alkoxy(C$_2$-C$_{20}$)alkyl or C$_1$-C$_{20}$ haloalkyl, R$_{23}$ and R$_{24}$ are each independently C$_1$-C$_{20}$ alkyl, C$_1$-C$_{20}$ cycloalkyl, phenyl or substituted phenyl, the phenyl substituents being C$_1$-C$_{20}$ alkyl or C$_1$-C$_{20}$ alkoxy, and said halo substituent is chloro or fluoro, aryl, mono(C$_1$-C$_{20}$)alkoxyaryl, di(C$_1$-C$_{20}$)alkoxyaryl, mono(C$_1$-C$_{20}$)alkylaryl, di(C$_1$-C$_{20}$)alkylaryl, haloaryl, C$_3$-C$_{10}$ cycloalkylaryl, C$_3$-C$_{10}$ cycloalkyl, C$_3$-C$_{10}$ cycloalkyloxy, C$_3$-C$_{10}$ cycloalkyloxy(C$_1$-C$_{20}$)alkyl, C$_3$-C$_{10}$ cycloalkyloxy(C$_1$-C$_{20}$)alkoxy, aryl(C$_1$-C$_{20}$)alkyl, aryl(C$_1$-C$_{20}$)alkoxy, aryloxy, aryloxy(C$_1$-C$_{20}$)alkyl, aryloxy(C$_1$-C$_{20}$)alkoxy, mono- or di(C$_1$-C$_{20}$)alkylaryl(C$_1$-C$_{20}$)alkyl, mono- or di-(C$_1$-C$_{20}$)alkoxyaryl(C$_1$-C$_{20}$)alkyl, mono- or di-(C$_1$-C$_{20}$)alkylaryl(C$_1$-C$_{20}$)alkoxy, mono- or di-(C$_1$-C$_{20}$)alkoxyaryl(C$_1$-C$_{20}$)alkoxy, amino, mono- or di-(C$_1$-C$_{20}$)alkylamino, diarylamino, piperazino, N—(C$_1$-C$_{20}$)alkylpiperazino, N-arylpiperazino, aziridino, indolino, piperidino, morpholino, thiomorpholino, tetrahydroquinolino, tetrahydroisoquinolino, pyrrolidyl, C$_1$-C$_{20}$ alkyl, C$_1$-C$_{20}$ haloalkyl, C$_1$-C$_{20}$ alkoxy, mono(C$_1$-C$_{20}$)alkoxy(C$_1$-C$_{20}$)alkyl, acryloxy, methacryloxy, acyloxy(C$_1$-C$_6$ alkyl), acyloxy(C$_3$-C$_7$ cycloalkyl), acyloxy(aryl), or halogen.

In accordance with some alternative embodiments, and with further reference to the indenonaphthopyran represented by Formula (III), B and B' are each independently an unsubstituted or mono-substituted group chosen from pyrazolyl, imidazolyl, pyrazolinyl, imidazolinyl, pyrrolinyl, phenothiazinyl, phenoxazinyl, phenazinyl, and acridinyl. Each of these substituents are, with some embodiments, C$_1$-C$_{20}$ alkyl, C$_1$-C$_{20}$ alkoxy, phenyl, or halogen.

In accordance with some alternative embodiments, and with further reference to the indenonaphthopyran represented by Formula (III), B and B' are each independently a group represented by one of:

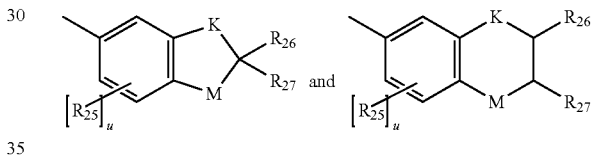

With reference to the formulas immediately above, K is —CH$_2$— or —O—, and M is —O— or substituted nitrogen, provided that when M is substituted nitrogen, K is —CH$_2$—, the substituted nitrogen substituents being hydrogen, C$_1$-C$_{20}$ alkyl, or C$_1$-C$_{20}$, acyl, each R$_{25}$ being independently chosen for each occurrence from C$_1$-C$_{20}$ alkyl, C$_1$-C$_{20}$ alkoxy, hydroxy, and halogen, R$_{26}$ and R$_{27}$ each being independently hydrogen or C$_1$-C$_{20}$ alkyl, and u is an integer ranging from 0 to 2.

In accordance with some alternative embodiments, and with further reference to the indenonaphthopyran represented by Formula (III), B and B' are each independently, a group represented by:

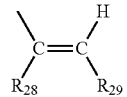

With reference to the formula immediately above, R$_{28}$ is hydrogen or C$_1$-C$_{20}$ alkyl, and R$_{29}$ is an unsubstituted, mono-, or di-substituted group chosen from naphthyl, phenyl, furanyl, and thienyl, in which the substituents are C$_1$-C$_{20}$ alkyl, C$_1$-C$_{20}$ alkoxy, or halogen.

In accordance with some embodiments, B and B', of Formula (III), taken together form one of a fluoren-9-ylidene, mono-, or di-substituted fluoren-9-ylidene, each of said fluoren-9-ylidene, in which the substituents are each independently chosen from C$_1$-C$_{20}$ alkyl, C$_1$-C$_{20}$ alkoxy, and halogen.

With some embodiments, $R_7$ independently for each x and $R_8$ independently for each y, of the indenonaphthopyran represented by Formula (III), are each independently selected from, hydrogen, $C_1$-$C_6$ alkyl, $C_3$-$C_7$ cycloalkyl, morpholino, morpholino substituted with $C_1$-$C_8$ linear or branched alkyl, $C_1$-$C_8$ haloalkyl, fluoro, chloro, and —O—$R_{10}'$.

With some further embodiments, $R_9$ and $R_{10}$, of the indenonaphthopyran represented by Formula (III), are each independently selected from hydrogen, $C_1$-$C_8$ alkyl, $C_1$-$C_8$ haloalkyl, and $C_3$-$C_7$ cycloalkyl, or together form a spiro substituent selected from a substituted or unsubstituted spirocarbocyclic ring containing 3 to 6 carbon atoms.

With some additional embodiments, B and B', of the indenonaphthopyran represented by Formula (III), are each independently selected from aryl, aryl substituted with $C_1$-$C_6$alkoxy, and aryl substituted with morpholino.

As previously discussed with regard to the indenonaphthopyran represented by Formula (III): $R_7$ and $R_8$, can each be independently selected from a compatibilizing substituent; and B and B' can each be selected from an aryl group that is mono-substituted with a compatibilizing substituent. If the indenonaphthopyran includes multiple compatibilizing substituents, each compatibilizing substituent can be independently chosen.

Each compatibilizing substituent can independently be represented by one of the following:

| | | |
|---|---|---|
| -A'-D-E-G-J (XIII); | -G-E-G-J (XVI); | -D-E-G-J (XIX); |
| -A'-D-J (XIV); | -D-G-J (XVII); | -D-J (XX); |
| -A'-G-J (XV); | -G-J (XVIII); and | -A'-J (XXI). |

With formulas (XIII) through (XXI), non-limiting examples of groups that -A'- can represent according to various non-limiting embodiments disclosed herein include —O—, —C(=O)—, —CH$_2$—, —OC(=O)— and —NHC(=O)—, provided that if represents —O—, -A'- forms at least one bond with -J.

Non-limiting examples of groups that -D- can represent according to various non-limiting embodiments include a diamine residue or a derivative thereof, wherein a first amino nitrogen of said diamine residue can form a bond with -A'-, or a substituent or an available position on the indeno-fused naphthopyran, and a second amino nitrogen of said diamine residue can form a bond with -E-, -G- or -J; and an amino alcohol residue or a derivative thereof, wherein an amino nitrogen of said amino alcohol residue can form a bond with -A'-, or a substituent or an available position on the indeno-fused naphthopyran, and an alcohol oxygen of said amino alcohol residue can form a bond with -E-, -G- or -J. Alternatively, according to various non-limiting embodiments disclosed herein the amino nitrogen of the amino alcohol residue can form a bond with -E-, -G- or -J, and the alcohol oxygen of the amino alcohol residue can form a bond with -A'-, or a substituent or an available position on the indenonaphthopyran.

Non-limiting examples of suitable diamine residues that -D- can represent include an aliphatic diamine residue, a cyclo aliphatic diamine residue, a diazacycloalkane residue, an azacyclo aliphatic amine residue, a diazacrown ether residue, and an aromatic diamine residue. More particular, illustrative and non-limiting examples of diamine residues that can be used in conjunction with various non-limiting embodiments disclosed herein include the following:

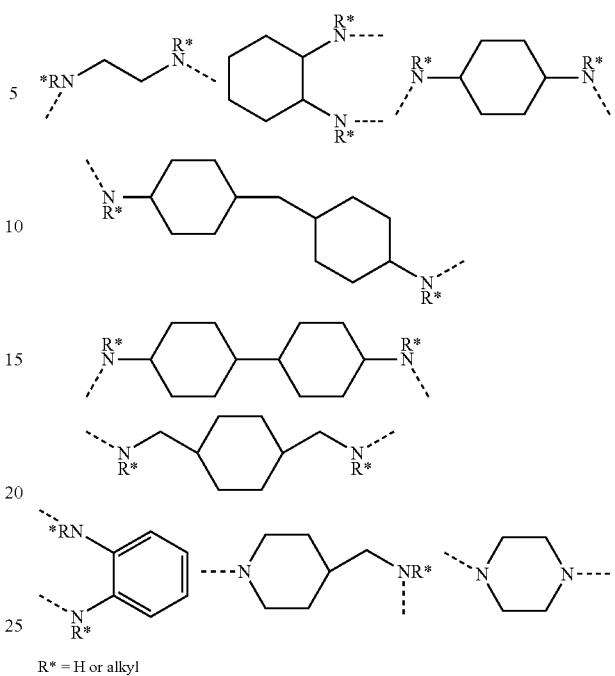

R* = H or alkyl

Non-limiting examples of suitable amino alcohol residues that -D- can represent include an aliphatic amino alcohol residue, a cyclo aliphatic amino alcohol residue, an azacyclo aliphatic alcohol residue, a diazacyclo aliphatic alcohol residue and an aromatic amino alcohol residue. More particular, illustrative and non-limiting examples of amino alcohol residues that can be used in conjunction with various non-limiting embodiments disclosed herein include the following:

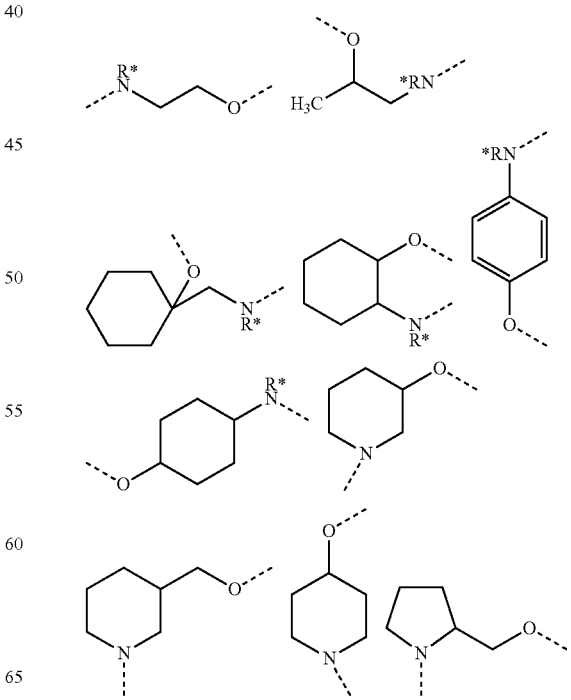

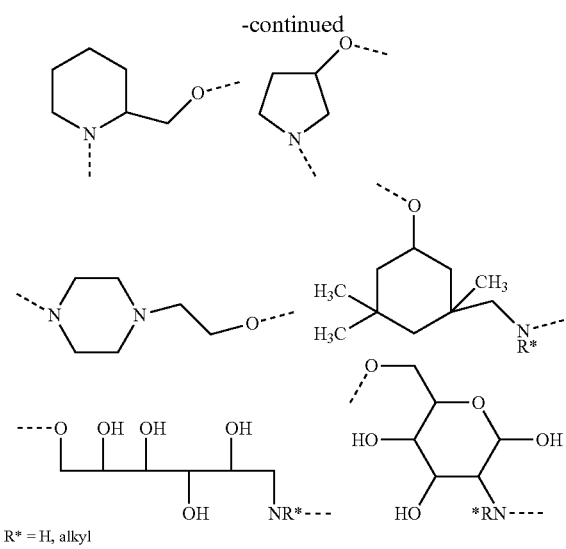

R* = H, alkyl

With continued reference to formulas (XIII) through (XXI) above, according to various non-limiting embodiments disclosed herein, -E- can represent a dicarboxylic acid residue or a derivative thereof, wherein a first carbonyl group of said dicarboxylic acid residue can form a bond with -G- or -D-, and a second carbonyl group of said dicarboxylic acid residue can form a bond with -G-. Nonlimiting examples of suitable dicarboxylic acid residues that -E- can represent include an aliphatic dicarboxylic acid residue, a cycloaliphatic dicarboxylic acid residue and an aromatic dicarboxylic acid residue. More particular, illustrative and non-limiting examples of dicarboxylic acid residues that can be used in conjunction with various non-limiting embodiments disclosed herein include the following:

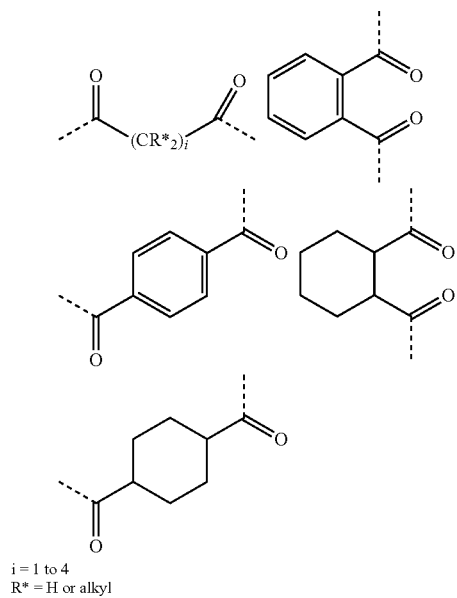

i = 1 to 4
R* = H or alkyl

According to various non-limiting embodiments disclosed herein, -G- can represent a group represented by the following general formula,

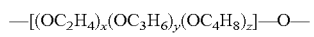

—[(OC$_2$H$_4$)$_x$(OC$_3$H$_6$)$_y$(OC$_4$H$_8$)$_z$]—O— in which x, y and z are each independently chosen and range from 0 to 50, and a sum of x, y, and z ranges from 1 to 50; a polyol residue or a derivative thereof, wherein a first polyol oxygen of said polyol residue can form a bond with -A'-, -D-, -E-, or a substituent or an available position on the indeno-fused naphthopyran, and a second polyol oxygen of said polyol can form a bond with -E- or -J; or a combination thereof, wherein the first polyol oxygen of the polyol residue forms a bond with a group —[(OC$_2$H$_4$)$_x$(OC$_3$H$_6$)$_y$(OC$_4$H$_8$)$_z$]— (i.e., to form the group —[(OC$_2$H$_4$)$_x$(OC$_3$H$_6$)$_y$(OC$_4$H$_8$)$_z$]—O—), and the second polyol oxygen forms a bond with -E- or -J. Non-limiting examples of suitable polyol residues that -G- can represent include an aliphatic polyol residue, a cyclo aliphatic polyol residue and an aromatic polyol residue.

More particular, illustrative and non-limiting examples of polyols from which the polyol residues that -G- can represent can be formed according to various non-limiting embodiments disclosed herein include (a) low molecular weight polyols having an average molecular weight less than 500, such as, but not limited to, those set forth in U.S. Pat. No. 6,555,028 at col. 4, lines 48-50, and col. 4, line 55 to ed. 6, line 5, which disclosure is hereby specifically incorporated by reference herein; (b) polyester polyols, such as, but not limited to, those set forth in U.S. Pat. No. 6,555,028 at col. 5, lines 7-33, which disclosure is hereby specifically incorporated by reference herein; (c) polyether polyols, such as but not limited to those set forth in U.S. Pat. No. 6,555,028 at col. 5, lines 34-50, which disclosure is hereby specifically incorporated by reference herein; (d) amide-containing polyols, such as, but not limited to, those set forth in U.S. Pat. No. 6,555,028 at col. 5, lines 51-62, which disclosure is hereby specifically incorporated by reference; (e) epoxy polyols, such as, but not limited to, those set forth in U.S. Pat. No. 6,555,028 at col. 5 line 63 to col, 6, line 3, which disclosure is hereby specifically incorporated by reference herein; (f) polyhydric polyvinyl alcohols, such as, but not limited to, those set forth in U.S. Pat. No. 6,555,028 at col. 6, lines 4-12, which disclosure is hereby specifically incorporated by reference herein; (g) urethane polyols, such as but not limited to those set forth in U.S. Pat. No. 6,555,028 at col. 6, lines 13-43, which disclosure is hereby specifically incorporated by reference herein; (h) polyacrylic polyols, such as, but not limited to those set forth in U.S. Pat. No. 6,555,028 at col. 6, lines 43 to col. 7, line 40, which disclosure is hereby specifically incorporated by reference herein; (i) polycarbonate polyols, such as, but not limited to, those set forth in U.S. Pat. No. 6,555,028 at col, 7, lines 41-55, which disclosure is hereby specifically incorporated by reference herein; and (j) mixtures of such polyols.

With further reference to formulas (XIII) through (XXI), according to various non-limiting embodiments disclosed herein, -J can represent a group -K, wherein -K represents a group such as, but not limited to, —CH$_2$COOH, —CH(CH$_3$)COOH, —C(O)(CH$_2$)$_w$COOH, —C$_6$H$_4$SO$_3$H, —C$_5$H$_{10}$SO$_3$H, —C$_4$H$_8$SO$_3$H, —C$_3$H$_6$SO$_3$H, —C$_2$H$_4$SO$_3$H and —SO$_3$H, wherein "w" ranges from 1 to 18. According to other non-limiting embodiments -J can represent hydrogen that forms a bond with an oxygen or a nitrogen of linking group to form a reactive moiety such as —OH or —NH. For example, according to various non-limiting embodiments disclosed herein, can represent hydrogen, provided that if -J represents hydrogen, is bonded to an oxygen of -D- or -G-, or a nitrogen of -D-.

According to still further non-limiting embodiments, -J can represent a group -L or residue thereof, wherein -L can represent a reactive moiety. For example, according to various non-limiting embodiments disclosed herein -L can represent a group such as, but not limited to, acryl, methacryl, crotyl, 2-(methacryloxy)ethylcarbamyl, 2-(methacryloxy)ethoxycarbonyl, 4-vinylphenyl, vinyl, 1-chlorovinyl or epoxy. As used herein, the terms acryl, methacryl; crotyl, 2-(methacryloxy)ethylcarbamyl, 2-(methacryloxy)ethoxycarbonyl, 4-vinylphenyl, vinyl, 1-chlorovinyl, and epoxy refer to the following structures:

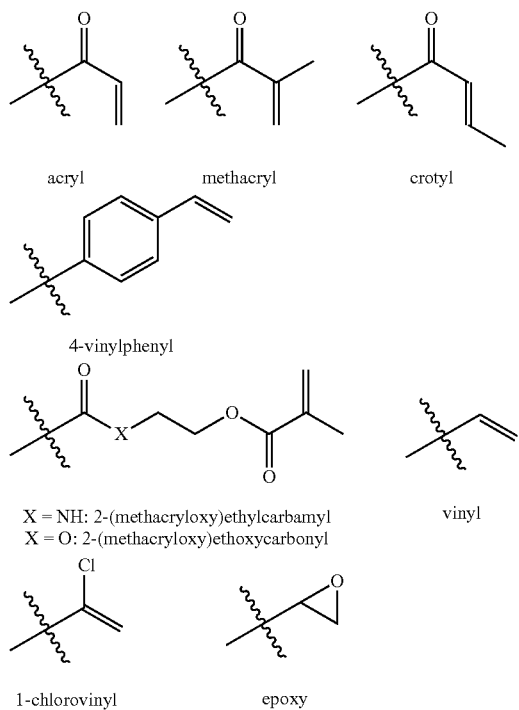

As previously discussed, -G- can represent a residue of a polyol, which is defined herein to include hydroxy-containing carbohydrates, such as those set forth in U.S. Pat. No. 6,555,028 at col. 7, line 56 to col. 6, line 17, which disclosure is hereby specifically incorporated by reference herein. The polyol residue can be formed, for example and without limitation herein, by the reaction of one or more of the polyol hydroxyl groups with a precursor of -A'-, such as a carboxylic acid or a methylene halide, a precursor of polyalkoxylated group, such as polyalkylene glycol, or a hydroxyl substituent of the indenonaphthopyran. The polyol can be represented by q-(OH)$_a$ and the residue of the polyol can be represented by the formula —O-q-(OH)$_{a-1}$, wherein q is the backbone or main chain of the polyhydroxy compound and "a" is at least 2.

Further, as discussed above, one or more of the polyol oxygens of -G- can form a bond with -J (i.e., forming the group -G-J). For example, although not limiting herein, wherein the reactive and/or compatiblizing substituent comprises the group -G-J, if -G- represents a polyol residue and -J represents a group -K that contains a carboxyl terminating group, -G-J can be produced by reacting one or more polyol hydroxyl groups to form the group -K (for example as discussed with respect to Reactions B and C at col, 13, line 22 to col. 16, line 15 of U.S. Pat. No. 6,555,028, which disclosure is hereby specifically incorporated by reference herein) to produce a carboxylated polyol residue. Alternatively, if -J represents a group -K that contains a sulfo or sulfono terminating group, although not limiting herein, -G-J can be produced by acidic condensation of one or more of the polyol hydroxyl groups with HOC$_6$H$_4$SO$_3$H; HOC$_5$H$_{10}$SO$_3$H; HOC$_4$H$_8$SO$_3$H; HOC$_3$H$_6$SO$_3$H; HOC$_2$H$_4$SO$_3$H; or H$_2$SO$_4$, respectively. Further, although not limiting herein, if -G- represents a polyol residue and -J represents a group -L chosen from acryl, methacryl, 2-(methacryloxy)ethylcarbamyl and epoxy, -L can be added by condensation of the polyol residue with acryloyl chloride, methacryloyl chloride, 2-isocyanatoethyl methacrylate or epichlorohydrin, respectively.

Further non-limiting examples of reactive and/or compatibilizing substituents are set forth in U.S. Pat. No. 6,555,028, at col. 3, line 45 to col, 4, line 26, and U.S. Pat. No. 6,113,814 at col. 3, lines 30-64, which disclosures are hereby specifically incorporated by reference herein.

The spirooxazine compounds of the present invention can be prepared by art-recognized methods. With some embodiments, the spirooxazine compounds of the present invention can be synthesized in general accordance with the description provided in U.S. Pat. No. 6,019,914 at column 9, lines 7-48, which disclosure is incorporated herein by reference.

The indenonaphthopyran compounds of the present invention can be prepared by art-recognized methods. With some embodiments, the indenonaphthopyran compounds of the present invention can be synthesized in general accordance with the description provided in U.S. Pat. No. 6,296,785, at column 10, line 52 through column 29, line 18, which disclosure is incorporated herein by reference. With some further embodiments, the indenonaphthopyran compounds of the present invention can be synthesized in general accordance with the description provided in U.S. Pat. No. 7,527,754 B2 at column 13, line 52 through column 14, line 62, which disclosure is incorporated herein by reference. With some additional further embodiments, the indenonaphthopyran compounds of the present invention can be synthesized in general accordance with the description provided in U.S. Pat. No. 5,645,767, at column 5, line 6 through column 11, line 31, which disclosure is incorporated herein by reference.

Each polymer of the polymer composition of the present invention can independently be a thermoplastic polymer or a curable polymer. When the polymer is a curable polymer it has, with some embodiments, one or more functional groups that are reactive with the (i) functional groups of another material, such as a crosslinking agent, and/or (ii) other functional groups on the same polymer.

In accordance with some embodiments of the polymer composition of the present invention: the polymer includes at least one first reactive group; and the polymer composition further includes at least one crosslinking agent that includes at least two second reactive groups that are reactive with and form covalent bonds with the first reactive group(s) of the polymer.

In accordance with some embodiments of the polymer composition of the present invention: the polymer includes at least one active hydrogen group selected from hydroxyl, thiol, carboxylic acid, primary amine, and secondary amine; and the polymer composition further includes at least one crosslinking agent that includes at least two functional groups selected from cyclic carboxylic acid anhydrides, oxiranes, thiooxiranes, isocyanates, thioisocyanates, cyclic carboxylic acid esters, cyclic amides, and cyclic carbonates. With some further embodiments, the crosslinking agent includes at least two functional groups selected from oxiranes, thiooxiranes, isocyanates, thioisocyanates. The crosslinking agent, in accordance with some additional embodiments, includes at least two functional groups selected from oxiranes and isocyanates.

The crosslinking agent, with some embodiments, includes a separate polymer according to the present invention, which includes at least two functional groups selected from cyclic carboxylic acid anhydrides, oxiranes, thiooxiranes, isocyanates, thioisocyanates, cyclic carboxylic acid esters, cyclic amides, and cyclic carbonates. The crosslinking agent polymer can be prepared in accordance with the description and methods provided previously herein, using a spirooxazine represented by Formula (II) and/or an indenonaphthopyran represented by Formula (III).

With some embodiments, the crosslinking agent is a polymer, but is not prepared using a spirooxazine represented by Formula (II) or an indenonaphthopyran represented by Formula (III). With, some embodiments, the crosslinking agent is a polymer that does not include residues of a spirooxazine represented by Formula (II) or an indenonaphthopyran represented by Formula (III), is free of one or more polymer segments represented by Formula (I), and is selected from polyester polymers, polyurethane polymers, polycarbonate polymers, polyether polymers, polyamide polymers, polyimide polymers, polyamideimide polymers, polyurea polymers, polysulfone polymers, polyketone polymers, and combinations of two or more thereof.

Examples of isocyanate functional materials from which the crosslinking agent can be selected, with some embodiments, include but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate, methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate and mixtures thereof.

The polyisocyanate crosslinking agent can, with some embodiments, be selected from polyisocyanates prepared from dimers and trimers of diisocyante monomers. Dimers and trimers of diisocyanate monomers can be prepared by art-recognized methods, such as described in U.S. Pat. No. 5,777,061 at column 3, line 44 through column 4, line 40. Dimers and trimers of the above recited diisocyanate monomers can contain linkages selected from the group consisting of isocyanurate, uretdione, biuret, allophanate and combinations thereof.

The isocyanate functional crosslinking agent can also be selected from (i) polyisocyanate functional polymer having at least two isocyanate groups, (ii) oligomeric polyisocyanate functional adduct and mixtures thereof. The polyisocyanate functional polymer and oligomeric polyisocyanate functional adduct can each contain structural linkages selected from urethane, i.e., —NH—C(O)—O—, thiourethane, i.e., —NH—C(O)—S—, urea, e.g., —NH—C(O)—NH—, and combinations of these structural linkages. The polyisocyanate polymer can be prepared, by art-recognized methods, from one or more monomers having at least two reactive hydrogen groups, such as thiol, hydroxy, primary amine and secondary amine groups, and one or more monomers having two or more isocyanate groups. The molar equivalent ratio of reactive hydrogen groups to isocyanate groups is selected such that the resulting polymer has the desired end groups, i.e., isocyanate groups. The number average molecular weight (Mn) of the polyisocyanate-functional polymer is less than 20,000, such as from 1,000 and 10,000, with some embodiments.

With some embodiments of the present invention, the polyisocyanate functional polymer is a polyisocyanate functional polyurethane prepared from aliphatic diols and aliphatic diisocyanates. Optionally, the polyisocyanate functional polyurethane may be prepared using relatively small amounts of monomers having three or more functional groups, such as triols and/or triisocyanates, to increase the functionality and branching of the polyurethane, in accordance with art-recognized methods.

As used herein, by "oligomeric polyisocyanate functional adduct" is meant a material that is substantially free of polymeric chain extension. Oligomeric polyisocyanate functional adducts can be prepared by art-recognized methods from, for example, a compound containing three or more active hydrogen groups, such as trimethylolpropane (TMP), and an isocyanate monomer, such as 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared ("TMP-3IPDI").

Depending on the type of active hydrogen group containing compound(s) used (e.g., polyols, polyamines and polythiols) the oligomeric polyisocyanate functional adduct can contain structural linkages selected from the urethane, thiourethane, urea and combinations thereof, as described previously herein. The active hydrogen group containing compound is aliphatic with some embodiments, such as TMP, trishydroxyisocyanurate, pentaerythritol and trimethylolpropane tris(mercaptoacetate). The isocyanate monomer is, with some embodiments, a diisocyanate monomer and can be selected from those described previously herein.

The isocyanate groups of the isocyanate functional crosslinking agent can, with some embodiments, be capped or blocked with a capping/blocking agent. After exposure to elevated temperature, the capping/blocking agent separates from the isocyanate functional material, allowing the free/unblocked isocyanate groups thereof to react and form covalent bonds with the active hydrogen groups of the polymer prepared by controlled radical polymerization according to the present invention. After unblocking or decapping from the polyisocyanate, the capping agent can volatize out of the composition (prior to the composition becoming vitrified) and/or remain in the composition, such as a plasticizer. With some embodiments, it is desirable that the capping agent not form bubbles in the composition and/or overly plasticize the composition after decapping.

The capping groups of the capped polyisocyanate crosslinking agent can be selected from, with some embodiments hydroxy functional compounds, 1H-azoles, lecterns, ketoximes and mixtures thereof. Classes of hydroxy functional compounds include, but are not limited to, aliphatic, cycloaliphatic, or aromatic alkyl monoalcohols or phenolics. Specific examples of hydroxy functional compounds useful as capping agents, include, but are not limited to: lower aliphatic alcohols such as methanol, ethanol, and n-butanol; cycloaliphatic alcohols such as cyclohexanol and tetrahydrofuran; aromatic-alkyl alcohols, such as phenyl carbinol and methylphenyl carbinol; and glycol ethers, e.g., ethylene glycol butyl ether, diethylene glycol butyl ether, ethylene glycol methyl ether and propylene glycol methyl ether. With some embodiments, the hydroxy functional capping groups include the phenolics, examples of which include, but are not limited to, phenol itself and substituted phenols, such as cresol, nitrophenol and p-hydroxy methylbenzoate.

Examples of 1H-azoles that are useful as capping groups include, but are not limited to 1H-imidazole, 1H-pyrazole, 1H-3,5-dimethyl pyrazole, 1H-2,5-dimethyl pyrazole, 1H-1,2,3-triazole, 1H-1,2,3-benzotriazole, 1H-1,2,4-triazole, 1H-5-methyl-1,2,4-triazole, and 1H-3-amino-1,2,4-triazole.

Ketoximes useful as capping groups include those prepared from aliphatic or cycloaliphatic ketones. Examples of ketoxime capping groups include, but are limited to, 2-propanone oxime (acetone oxime), 2-butanone oxime, 2-pentanone oxime, 3-pentanone oxime, 3-methyl-2-butanone oxime, 4-methyl-2-pentanone oxime, 3,3-dimethyl-2-butanone oxime, 2-heptanone oxime, 3-heptanone oxime, 4-heptanone oxime, 5-methyl-3-heptanone oxime, 2,6-dimethyl-4-heptanone oxime, cyclopentanone oxime, cyclohexanone oxime, 3-methylcyclohexanone oxime, 3,3,5-trimethylcyclohexanone oxime and 3,5,5-trimethyl-2-cyclohexene-5-one oxime.

Examples of lectern capping groups include, but are not limited to, e-caprolactam and 2-pyrrolidinone. Other suitable capping groups include, morpholine, 3-aminopropyl morpholine and N-hydroxy phthalimide.

Oxirane functional crosslinking agents can be prepared by reacting a hydroxyl functional material having at least two hydroxyl groups with a 2-(halomethyl)oxirane, such as 2-(chloromethyl)oxirane, which is also referred to as epichlorohydrin. Examples of polyols that can be used to prepare oxirane functional crosslinking agents include, but are not limited to, glycerin, trimethylolpropane, trimethylolethane, trishydroxyethylisocyanurate, pentaerythritol, ethylene glycol, propylene glycol, trimethylene glycol, butanediol, heptanediol, hexanediol, octanediol, 4,4'-(propane-2,2-diyl)dicyclohexanol, 4,4'-methylenedicyclonexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, and 4,4'-methylenediphenol.

The oxirane functional crosslinking agent can be a polymeric material. With some embodiments, the polymeric oxirane functional crosslinking agent can be prepared from an oxirane functional material having at least two oxirane groups and an active hydrogen functional material having at least two active hydrogen groups, such as at least two hydroxyl groups. Examples of polyols that can be used to prepare polymeric oxirane functional crosslinking agents include, but are not limited to those classes and examples recited previously herein with regard to preparing the oxirane functional crosslinking agent.

The polymer, with some embodiments, is present in the polymer composition of the present invention in an amount of at least 2 percent by weight, or at least 10 percent by weight, or at least 20 percent by weight, or at least 30 percent by weight, or at least 50 percent by weight, or at least 70 percent by weight, or at least 80 percent by weight, based on total weight of resin solids of the polymer composition. The polymer composition also, with same embodiments, contains the polymer in an amount of less than or equal to 98 percent by weight, or less than or equal to 95 by weight, or less than or equal to 90 percent by weight, based on total weight of resin solids of the polymer composition. The polymer can, with some embodiments, be present in the polymer composition of the present invention in an amount ranging between any combination of these values, inclusive of the recited values, such as from 2 to 98 percent by weight, or from 10 to 98 percent by weight, or from 20 to 98 percent by weight, or from 30 to 98 percent by weight, or from 50 to 98 percent by weight, or from 70 to 95 percent by weight, or from 80 to 90 percent by weight, in each case based on total weight of resin solids of the polymer composition. With some further embodiments, the polymer is present in the polymer composition of the present invention in an amount of from 2 to 50 percent by weight, or from 5 to 30 percent by weight, or from 10 to 25 percent by weight, in each case based on total weight of resin solids of the polymer composition.

The crosslinking agent is present, with some embodiments, in the polymer composition of the present invention in an amount of at least 2 percent by weight, or at least 5 percent by weight, or at least 10 percent by weight, based on total weight of resin solids of the polymer composition. The crosslinking agent can also, with some embodiments be present in the polymer composition in an amount of less than or equal to 70 percent by weight, or an amount of less than or equal to 50 percent by weight, or less than or equal to 30 percent by weight, or less than or equal to 20 percent by weight, based on total weight of resin solids of the polymer composition. The crosslinking agent can be present in the polymer composition of the present invention in an amount ranging between any combination of these values, inclusive of the recited values, such as from 2 to 70 percent by weight, or from 2 to 50 percent by weight, or from 5 to 30 percent by weight, or from 10 to 20 percent by weight, based on total weight of resin solids of the curable particulate composition, and, inclusive of the recited values.

The polymer is present in the polymer composition, with some embodiments, in an amount of from 30 to 98 percent by weight, based on total resin solids weight of the polymer composition; and the crosslinking agent is present in the polymer composition, with some embodiments, in an amount of from 2 to 70 percent by weight, based on total resin solids weight of the polymer composition.

In accordance with some embodiments, the polymer compositions of the present invention include one or more additional polymers that do not include (and are free of) a residue of a mechanochromic compound, such as represented by Formulas and (III), which can be referred to as non-mechanochromic polymers. Examples of such non-mechanochromic polymers include, but are not limited to, polyester polymers, polyurethane polymers, polycarbonate polymers, polyether polymers, polyimide polymers, polyimide polymers, polyamideimide polymers, polyurea polymers, polysulfone polymers, polyketone polymers, polyvinyl polymers, polyolefins, poly(meth)acrylates, and combinations of two or more thereof. Each non-mechanochromic polymer can include, with some embodiments: one or more (such as two or more) active hydrogen groups, such as hydroxyl, thiol, carboxylic acid, primary amine, and secondary amine; and/or one or more such as two or more) functional groups that are reactive with active hydrogen groups, such as, cyclic carboxylic acid anhydrides, oxiranes, thiooxiranes, isocyanates, thioisocyanates, cyclic carboxylic acid esters, cyclic amides, and cyclic carbonates. With some embodiments, the non-mechanochromic polymer is present in an amount of from 2 to 98 percent by weight, or from 10 to 80 percent by weight, or from 20 to 70 percent by weight, or from 30 to 60 percent by weight, or from 30 to 50 percent by weight, where the percent by weights are in each case based on the total weight of the polymer of the present invention (which includes a residue of a mechanochromic compound such as represented by Formulas (II) and (III)) and the non-mechanochromic polymer.

To achieve a suitable level of cure with the polymer composition of the present invention, the equivalent ratio of active hydrogen equivalents of the polymer, to active hydrogen reactive equivalents (such as isocyanate or oxirane equivalents) of the crosslinking agent is, with some embodiments, from 0.7:1 to 2:1, or from 0.8:1 to 1.3:1.

The polymer composition of the present invention can be cured by any suitable methods. With some embodiments, the polymer composition is thermosetting, and is curable by exposure to elevated temperature. As used herein, by "cured" is meant a three dimensional crosslink network formed by covalent bond formation, such as between the active hydrogen groups of the polymer and the isocyanate or oxirane groups of the crosslinking agent. The temperature at which the thermosetting polymer composition of the present invention is cured is variable and depends in part on the amount of time during which curing is conducted. With some embodiments, the thermosetting polymer composition is cured at a temperature within the range of 90° C. to 204° C., or from 149° C. to 204° C., or from 154° C. to 177° C., for a period of 20 to 60 minutes.

The polymer compositions of the present invention can also, with some embodiments, include pigments and fillers. Examples of pigments include, but are not limited to: inorganic pigments, such as titanium dioxide and iron oxides; organic pigments, such as phthalocyanines, anthraquinones, quinacridones and thioindigos; and carbon blacks. Examples of fillers include, but are not limited to: silica, such as precipitated silicas; clay; and barium sulfate. When used in the polymer compositions of the present invention, pigments and fillers can, with some embodiments, be present in amounts of from 0.1 percent to 70 percent by weight, based on the total solids weight of the polymer composition (excluding solvent).

The polymer compositions of the present invention can with some embodiments, optionally contain additives such as, but not limited to: waxes for flow and wetting; flow control agents, such as poly(2-ethylhexyl)acrylate; antioxidants; and ultraviolet (UV) light absorbers. Examples of useful antioxidants and UV light absorbers include, but are not limited to, those available commercially from BASF under the trademarks IRGANOX and TINUVIN. These optional additives, when used can be present in amounts up to 20 percent by weight, based on total solids weight of the polymer composition (excluding solvent).

The polymer compositions of the present can, with some embodiments, include solvents, selected from water, organic solvents, and combinations thereof.

Classes of organic solvents that can be present in the polymer compositions of the present invention include, but are not limited to alcohols, e.g., methanol, ethanol, n-propanol, isopropanol, n-butanol, sec-butyl alcohol, tert-butyl alcohol, isobutyl alcohol, furfuryl alcohol and tetrahydrofurfuryl alcohol; ketones or ketoalcohols, e.g., acetone, methyl ethyl ketone, and diacetone alcohol; ethers, e.g., dimethyl ether and methyl ethyl ether; cyclic ethers, e.g., tetrahydrofuran and dioxane; esters, e.g., ethyl acetate, ethyl lactate, ethylene carbonate and propylene carbonate; polyhydric alcohols, e.g., ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, e.g., butyl 2-hydroxyethyl ether, hexyl 2-hydroxyethyl ether, methyl 2-hydroxypropyl ether and phenyl 2-hydroxypropyl ether; nitrogen containing cyclic compounds, e.g., pyrrolidone, N-methyl-2-pyrrolidone and 1,3-dimethyl-2-imidazolidinone; and sulfur containing compounds-such as thioglycol, dimethyl sulfoxide and tetramethylene sulfone.

Solvent(s) can be present in the polymer compositions of the present invention, in an amount of at least 5 percent by weight, or at least 15 percent by weight, or at least 30 percent by weight, based on the total weight of the polymer composition. The solvent(s) can also be present in the polymer composition in an amount of less than 95 percent by weight, or less than 80 percent by weight, or less than 60 percent by weight, based on the total weight of the pigment dispersion. The amount of solvent present in the polymer composition can range between any combination of these values, inclusive of the recited values, with some embodiments, such as from 5 to 95 percent by weight, or from 15 to 80 percent by weight, or from 30 to 60 percent by weight, in each case based on the total weight of the polymer composition.

With some embodiments, the polymer composition includes an additive selected from heat stabilizers, light stabilizers, and combinations thereof. Examples of useful heat stabilizers and light absorbers include, but are not limited to, those available commercially from BASF under the trademarks IRGANOX and TINUVIN. The optional heat stabilizers and light stabilizers, when used, can be present in amounts up to 20 percent by weight, based on total solids weight of the polymer composition (excluding solvent).

The present invention also relates to mechanochromic articles that include the polymer composition of the present invention as described previously herein. With some embodiments, the mechanochromic article is selected from films, sheets, and 3-dimensional articles.

The 3-dimensional articles from which the mechanochromic articles of the present invention can be selected include, but are not limited to, ophthalmic articles, display articles, windows, mirrors, protective articles and support articles.

The mechanochromic articles of the present invention, with some embodiments, are selected from ophthalmic articles, and the ophthalmic articles are selected from corrective lenses, non-corrective lenses, contact lenses, and magnifying lenses. As used herein the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

The mechanochromic articles of the present invention, with some embodiments, are selected from display articles, and the display articles are selected from screens, monitors, and security elements. As used herein the term "display" means the visible or machine-readable representation of information in words, numbers, symbols, designs or drawings. Non-limiting examples of display articles, elements and devices include screens, monitors, and security elements, such as security marks.

The mechanochromic articles of the present invention, with some embodiments, are selected from protective articles, and the protective articles are selected from protective lenses, protective visors, protective headgear, and protective housings. Examples of protective lenses include, but are not limited to, safety glasses and safety goggles, such as used in a laboratory and/or a work shop, such as a metal shop, welding shop, wood-working shop, automotive shop/garage, and the like. Examples of protective visors include, but are not limited to, those used with racing helmets (such as automotive, motorcycle, and boat racing helmets), aircraft helmets, hockey helmets, metal working helmets, and helmets used by ground military personnel. Examples of protective headgear include, but are not limited to, motorcycle helmets, aircraft helmets, speed boat helmets, automotive race helmets, baseball helmets, hockey helmets, equestrian helmets, helmets used by ground military personnel, construction helmets, oil filed helmets, and helmets used by metal workers. Examples of protective housings include, but are not limited to, housings for sensitive equipment, such as, analytical equipment, guidance systems (such as missile guidance systems), and medical equipment (such as insulin pumps).

The mechanochromic articles of the present invention are, with some embodiments, selected from support articles, and the support articles are selected from rods, beams, crossarms, and combinations thereof. The rods, beams, and crossarms can be substantially unitary articles, or composed of a plurality of components, in which at least some of the components are the mechanochromic articles of the present invention.

The mechanochromic article of the present invention, with some embodiments, is selected from a 3-dimensional article, and the 3-dimensional article includes a layer residing over at least a portion of at least one surface of the 3-dimensional article, in which the layer includes the polymer composition of the present invention as described previously herein, and is a mechanochromic layer. The mechanochromic layer can be selected from films, sheets, and/or coatings.

The mechanochromic article of the present invention, with some embodiments, is selected from a 3-dimensional article, and the 3-dimensional article includes a coating residing over at least a portion of at least one surface of the 3-dimensional article, in which the coating includes the polymer composition of the present invention as described previously herein, and is a mechanochromic coating.

With some embodiments, the coating is the polymer composition of the present invention, and the coating is a mechanochromic coating. The coating can be a single layer coating or a multiple layer coating, in which each layer thereof can have the same or a different composition. With some embodiments the coating is a multiple layer coating that includes a primer over at least a portion of a surface of the 3-dimensional article, a mechanochromic layer formed over the primer layer (in which the mechanochromic layer includes the polymer composition of the present invention), and an optional clear layer formed over the mechanochromic layer. The mechanochromic layer can be pigmented or unpigmented, with some embodiments. With some embodiments, the optional clear layer, which resides over the mechanochromic layer, can include an additive selected from heat stabilizers and/or light stabilizers. The heat stabilizers and light stabilizers can be present in amount(s) and the thickness of the clear layer can be selected such that photochromic activation of the residue of the mechanochromic compound(s) (represented by Formula (II) and/or (III), which resides within the polymer backbone of the polymer of the present invention) by actinic radiation is at least minimized, or substantially eliminated. With some embodiments, and for purposes of non-limiting illustration, the heat stabilizers and light stabilizers can be present in the clear layer in a total amount of up to 40% by weight, based on the total solids weight of the clear layer.

There is also provided a mechanochromic article that includes the polymer composition of the present invention, in which the mechanochromic article further includes a coating residing over at least a portion of at least one surface of the mechanochromic article. The coating is free of the polymer composition of the present invention, and the coating includes an additive selected from heat stabilizers, light stabilizers, and combinations thereof. The coating residing over the mechanochromic article can be referred to as an overcoating. The overcoating, which resides over the mechanochromic article, can be a clear overcoating, with some embodiments of the present invention. The heat stabilizers and light stabilizers can be present in amount(s) and the thickness of the clear overcoating can be selected such that photochromic activation of the residue of the mechanochromic compound (represented by Formula (II) and/or (III), which resides within the polymer backbone of the polymer of the present invention) by actinic radiation is at least minimized, or substantially eliminated. With some embodiments, and for purposes of non-limiting illustration, the heat stabilizers and light stabilizers can be present in the clear overcoating in a total amount of up to 40% by weight, based on the total solids weight of the clear overcoat.

The present invention is more particularly described in the following examples, which are intended to be illustrative only, since numerous modifications and variations therein will be apparent to those skilled in the art. Unless otherwise specified, all parts and percentages are by weight.

EXAMPLES

The examples of Part 1 describe the synthesis of controlled radical polymerization initiators. Part 2 describes the preparation of polymers made by controlled radical polymerization using the initiators of Part 1. Part 3 describes the preparation of film and coatings, and testing results for mechanochromic properties.

Part 1. Preparation of Controlled Radical Polymerization Initiators

Example 1

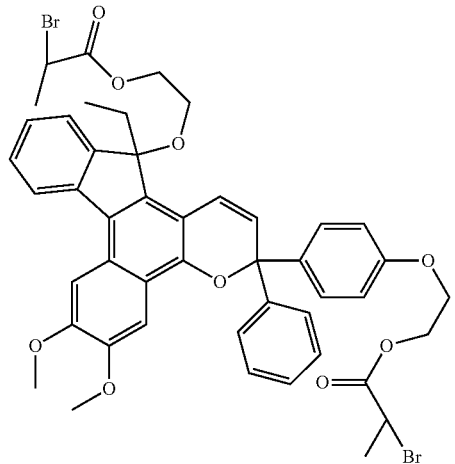 [SMILES: CCC1(OCCOC(=O)C(C)Br)c2ccccc2-c2c1c1c(c3cc(OC)c(OC)cc23)OC(c2ccccc2)(c2ccc(OCCOC(=O)C(C)Br)cc2)C=C1]

Into a 2 oz jar flushed with Nitrogen was added 3-phenyl-3-(4-(2-hydroxyethoxyphenyl))-6,7-dimethoxy-13-ethyl-13-(2-hydroxyethoxy)-3,13-dihydro-indeno[2',3',3,4]naphtho[1,2-b]pyran (0.56 g, 1 equiv), triethylamine (0.28 g, 3.1 equiv), and dichloromethane (10.2 g). This mixture was cooled in a dry ice/ethanol bath, and a solution of 2-bromopropionyl bromide (0.58 g, 3 equiv) in dichloromethane (1.5 g) was added. The jar was resealed and allowed to warm to room temperature. After stirring for 18 hours, 10 mL of water was added. The layers were separated, and the aqueous layer was extracted three times with dichloromethane. The combined organic layers were washed with saturated sodium bicarbonate, dried over $MgSO_4$, and concentrated under vacuum. The residue was filtered through a plug of silica, eluting with dichloromethane. After concentration of the eluent, 0.83 g of a brown oil was obtained, which was consistent with 3-phenyl-3-(4-(2-(2-bromopropionato)ethoxyphenyl))-6,7-dimethoxy-13-ethyl-13-(2-bromopropionatoethoxy)-3,13-dihydro-indeno[2',3',3,4]naphtho[1,2-b]pyran by $^1$H and $^{13}$C NMR.

Example 2

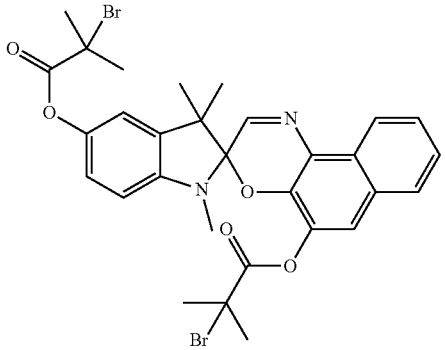 [SMILES: CN1c2ccc(OC(=O)C(C)(C)Br)cc2C(C)(C)C12C=Nc1c(c(OC(=O)C(C)(C)Br)cc3ccccc13)O2]

A solution of 1-nitroso-2,3-dihydroxynaphthalene, (1.08 g) in 13.75 mL of 1,2-dichloroethane was charged to a round bottomed flask and warmed to reflux. A mixture of 5-hydroxy-1,2,3,3-tetramethyl-3H-indol-1-ium iodide (1.74 g) and triethylamine (1.15 g) was added dropwise. The resulting dark solution was refluxed for 1 hour, then cooled to room temperature and a blue product was collected via filtration. This was immediately placed into a Nitrogen-flushed 2 oz jar. To the jar was added triethylamine (2.88 g), and dichloromethane (6.5 mL). This mixture was cooled in a dry ice/ethanol bath, and a solution of 2-bromoisobutyryl bromide (3.94 g) in dichloromethane (1.5 mL) was added. The jar was resealed and allowed to warm to room temperature. After stirring for 2 hours, the residue was dry packed onto a 6 inch by ¾ inch silica plug and eluted with 500 mL of a 2:1 solution of dichloromethane:heptanes, increasing to 5:1 dichloromethane:heptanes. The filtrate was concentrated, then the residue was purified by column chromatography with an elution gradient of 1:1 dichloromethane:heptanes, up to 4:1 dichloromethane:heptanes on silica, to provide 1,3,3-trimethylspiro[indoline-2,3'-naphtho[2,1-b][1,4]oxazine]-5,5'-diyl bis(2-bromo-2-methylpropionate) as a dark brown solid which was photochromic upon exposure to UV irradiation.

Example 3

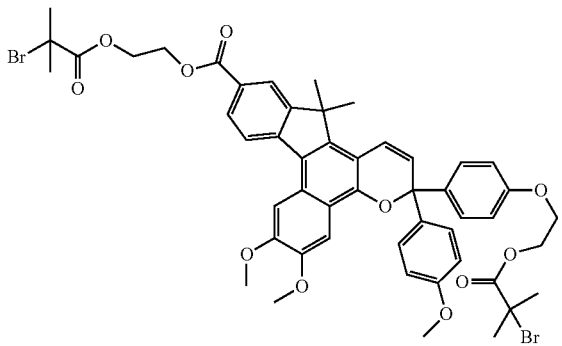 [SMILES: COc1ccc(C2(c3ccc(OCCOC(=O)C(C)(C)Br)cc3)C=Cc3c4c(c5cc(OC)c(OC)cc5c3O2)-c2ccc(C(=O)OCCOC(=O)C(C)(C)Br)cc2C4(C)C)cc1]

Into a 20 mL scintillation vial was charged 3-(4-methoxyphenyl)-3-(4-(2-hydroxyethoxyphenyl))-6,7-dimethoxy-11-carboxyl-13,13-dimethyl-3,13-dihydro-indeno[2',3':3,4]naphtho[1,2-b]pyran (0.1323 g), dicyclohexylcarbodiimide (DCC, 0.044 g), ethylene glycol (0.57 g), dimethylaminopyridine (0.0013 g), and dichloromethane (3.2 mL). The resulting solution was stirred at room temperature for 3 hours, at which time TLC analysis (100% ethyl acetate) on silica gel indicated complete consumption of starting material. The reaction was partitioned between dichloromethane and water, and the layers were separated. The organic layer was washed with water, dried over sodium sulfate and concentrated, yielding a green solid. This material was then converted to the initiator according to the general procedure in example 2, using 0.19 g of bromoisobutyryl bromide, 0.103 g triethylamine and 3 mL of dichloromethane (1.5 mL). Purification via column chromatography (methylene chloride, silica gel) yielded 0.11 g of a photochromic compound consistent with 3-(4-methoxyphenyl)-3-(4-(2-bromo-2-methylpropionato)ethoxyphenyl))-6,7-dimethoxy-11-(2-bromo-2-methylpropionatoethoxyoxyl)-13,13-dimethyl-3,13-dihydro-indeno[2',3':3,4]naphtho[1,2-b]pyran by $^1$H and $^{13}$C NMR.

Example 4

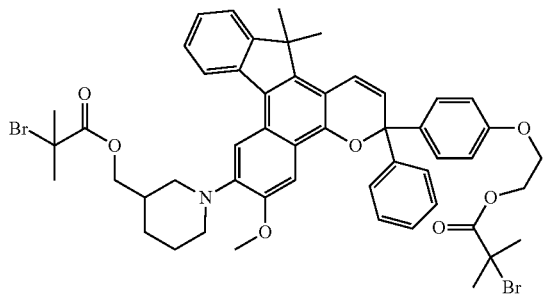 [SMILES: COc1cc2c3c(c4c(c2cc1N1CCCC(COC(=O)C(C)(C)Br)C1)-c1ccccc1C4(C)C)C=CC(c1ccccc1)(c1ccc(OCCOC(=O)C(C)(C)Br)cc1)O3]

3-(4-2-hydroxyethoxyphenyl)-3-(4-methoxyphenyl)-6-methoxy-7-(3-hydroxymethyl)piperidin-1-yl)-13,13-dimethyl-3,13-dihydro-indeno[2',3':3,4]naphtho[1,2-b]pyran (0.038 g) was placed into a Nitrogen-flushed 2 oz jar. To the jar was added triethylamine (0.028 g), and dichloromethane (1 g). This mixture was cooled in a dry ice/ethanol bath, and 2-bromoisobutyryl bromide (0.05 g), in dichloromethane (1 g) was added. The jar was resealed and allowed to warm to room temperature. After stirring overnight, the reaction was diluted with 4 mL of water. The layers were separated, and the aqueous layer was extracted three times with dichloromethane. The combined organics were dried over MgSO$_4$, and concentrated under vacuum. The residue purified by column chromatography (silica gel) using an elution gradient from 100% cyclohexane to 1:1 cyclohexane:diethyl ether. After concentration of the eluent, 13.4 mg of 3-(4-(2-bromo-2-methylpropionylethoxyphenyl)-3-(4-methoxyphenyl)-6-methoxy-7-(3-(2-bromo-2-methylpropionyloxymethyl)piperidin-1-yl)-13,13-dimethyl-3,13-dihydro-indeno[2',3':3,4]naphtho[1,2-b]pyran was obtained as a photochromic solid.

Example 5

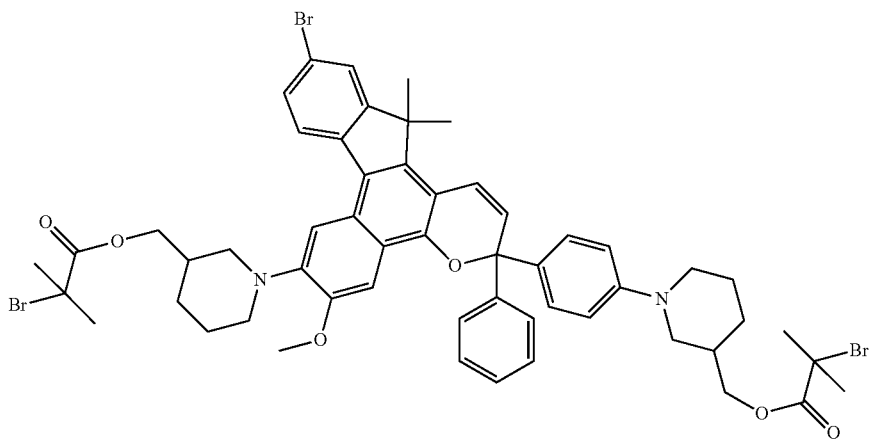 [SMILES: COc1cc2c3c(c4c(c2cc1N1CCCC(COC(=O)C(C)(C)Br)C1)-c1ccc(Br)cc1C4(C)C)C=CC(c1ccccc1)(c1ccc(N2CCCC(COC(=O)C(C)(C)Br)C2)cc1)O3]

3-(4-(3-hydroxymethylpiperidin-1-yl))-3-phenyl-6-methoxy-7-(3-hydroxymethyl)piperidin-1-yl-11-bromo-13,13-dimethyl-3,13-dihydro-indeno[2',3':3,4]naphtho[1,2-b]pyran (0.1 g) was placed into a Nitrogen-flushed 25 mL round bottomed flask. To the flask was added dichloromethane (1.5 g), then the mixture was cooled in an ice water bath. Triethylamine (0.0647 g) was added, followed by 2-bromoisobutyryl bromide (0.088 g). The flask was allowed to warm to room temperature. After stirring overnight, the solvent was removed and the residue was redissolved in diethyl ether. The salts were removed via filtration, and the eluent was concentrated. The residue was filtered through a short silica column to provide 3-(4-(3-(2-bromo-2-methylpropionyloxymethyl)piperidin-1-yl))-3-phenyl-6-methoxy-7-(3-(2-bromo-2-methylpropionyloxymethyl)piperidin-1-yl)-11-bromo-13,13-dimethyl-3,13-dihydro-indeno[2',3':3,4]naphtho[1,2-b]pyran (0.116 g, 84%) as a bluish-black photochromic solid.

Part 2. Preparation of Polymer Dyes by Controlled Radical Polymerization

Example 6

Into a flask immersed in a room temperature water bath was placed the initiator 3-phenyl-3-(4-(2-(2-bromopropionato)ethoxyphenyl))-6,7-dimethoxy-13-ethyl-13-(2-bromopropionatoethoxy)-3,13-dihydro-indeno[2',3':3,4]naphtho[1,2-b]pyran of Example 1 (0.1 g, 1 equiv), Cu metal (0.03 g, 4 equivs), tris(2-dimethylaminoethyl)amine (0.1 g, 4 equivs), and dry DMSO (107 mL). The resulting mixture was purged with dry Nitrogen for 20 min. Methyl acrylate (21.3 g, 2500 equivs) was filtered through a plug of alumina, purged with Nitrogen for 20 minutes, then added to the flask. The mixture was allowed to stir overnight at room temperature, after which a significant increase in viscosity was observed. The material was dissolved in tetrahydrofuran (THF, 20.7 g) and stirred open to the atmosphere for 5 minutes, at which time the viscous solution was filtered. The polymer was purified by precipitation into methanol. The off-white polymer was collected and dried under vacuum. The resulting polymeric compound was found to be reversibly photochromic under UV irradiation.

Example 7

Into a flask immersed in a room temperature water bath was placed the initiator 1,3,3-trimethylspiro[indoline-2,3'-naphtho[2,1-b][1,4]oxazine]-5,5'-diyl bis(2-bromo-2-methylpropionate) of Example 2 (0.5 g, 1 equiv), Cu metal (0.029 g, 2 equivs), tris(2-dimethylaminoethyl)amine (0.79 g, 2 equivs), and dry butyl acetate (1.3 mL). The resulting mixture was purged with dry Nitrogen for 20 min. Methyl acrylate (0.73, 37 equiv) and hydroxypropyl acrylate (0.96 g, 33 equiv) were then added to the flask. The mixture was allowed to stir overnight at room temperature, after which a significant increase in viscosity was observed. The material was dissolved in THF (20.7 g) then filtered through a plug of glass wool. To the filtrate was added approximately 2 g of AMBERLITE® IRC-748 (an ion exchange resin available from Dow Chemical) and 4 drops of acetic acid. This was stirred for 1 h, then filtered and concentrated to yield a thick oil. 1H NMR was consistent with the expected polymerization product containing the residue of the initiator of Example 1. The resulting polymeric material was found to be reversibly photochromic under UV irradiation.

Example 8

The initiator 3-(4-methoxyphenyl)-3-(4-(2-bromo-2-methylpropionato)ethoxyphenyl))-6,7-dimethoxy-11-(2-bromo-2-methylpropionatoethoxyoxyl)-13,13-dimethyl-3,13-dihydro-indeno[2',3':3,4]naphtho[1,2-]pyran of Example 3 (0.0305 g) was subjected to the conditions described in Example 6 except that 0.008 g Cu, 0.029 g tris(2-dimethylaminoethyl)amine, 4.32 g of methyl acrylate, and 2.8 g of DMSO was used. Gel Permeation Chromatography in THF indicated a peak MW of 128,614 (theory 140,000) relative to a linear polystyrene standard.

Example 9

The initiator 3-(4-(2-bromo-2-methylpropionylethoxyphenyl)-3-(4-methoxyphenyl)-6-methoxy-7-(3-(2-bromo-2-methylpropionyloxymethyl)piperidin-1-yl)-13,13-dimethyl-3,13-dihydro-indeno[2',3':3,4]naphtho[1,2-b]pyran of Example 4 (13.4 mg) was subjected to the polymerization conditions described in Example 6 except that 0.0035 g Cu, 0.013 g tris(2-dimethylaminoethyl)amine, 1.9 g of methyl acrylate, and 1.2 g of DMSO was used Gel Permeation Chromatography in THF indicated a peak MW of 163569 (theory 140,000) relative to a linear polystyrene standard.

Example 10

The initiator 1,3,3-trimethylspiro[indoline-2,3'-naphtho[2,1-b][1,4]oxazine]-5,5'-diyl bis(2-bromo-2-methylpropionate) of Example 2 (24.4 mg) was subjected to the polymerization conditions described in Example 6 except that 0.0094 g Cu, 0.034 g tris(2-dimethylaminoethyl)amine, 5.199 of methyl acrylate, and 3.4 g of DMSO was used. Gel Permeation Chromatography in THF indicated a peak MW of 183811 (theory 140,000) relative to a linear polystyrene standard.

Example 11

The initiator 3-(4-(3-(2-bromo-2-methylpropionyloxymethyl)piperidin-1-yl))-3-phenyl-6-methoxy-7-(3-(2-bromo-2-methylpropionyloxymethyl)piperidin-1-yl)-11-bromo-13,13-dimethyl-3,13-dihydro-indeno[2',3':3,4]naphtho[1,2-b]pyran of Example 5 (0.0815 g) was placed into a flask immersed in a room temperature water. To this was added Cu powder (0.0096 g), tris(2-dimethylaminoethyl)amine (0.027 g), and dry butyl acetate (1.0 mL). The resulting mixture was purged with dry Nitrogen for 10 minutes. Methyl acrylate (0.24) and hydroxypropyl acrylate (0.242 g) were then added to the flask. The mixture was allowed to stir overnight at room temperature, after which no significant increase in viscosity was observed. The mixture was then heated to 70° C. and stirred for six hours, then cooled and stirred overnight. The resulting material was dissolved in THF (10 mL) then filtered through a plug of glass wool. To the filtrate was added approximately 2 g of AMBERLITE IRC-748 resin and 4 drops of acetic acid. This was stirred for 1 h, then filtered and concentrated to yield a thick oil. The resulting material was found to be reversibly photochromic under UV irradiation.

Example 12

3-(4-(3-hydroxymethyl)piperidin-1-yl))-3-phenyl-6-methoxy-7-(3-hydroxymethyl)piperidin-1-yl)-11-bromo-13,13-dimethyl-3,13-dihydro-indeno[2',3':3,4]naphtho[1,2-b]pyran (0.22 g), toluene (6.58 g) and epsilon-caprolactone (0.58 g) were added into a 20 mL, glass vial. The glass vial was placed on a hot plate with magnetic stirring, set to 108° C. After stirring for 30 minutes, a dark solution was formed, and then 0.09 g diphenyl phosphate was added to the glass vial. When the concentration of epsilon-caprolactone was below 0.1% as measured by gas chromatography, the reaction solution was cooled to room temperature, and of triethylamine (0.14 g) was added. The mixture was stirred at room temperature for 30 minutes, then 1 mL of dichloromethane was added, and the mixture was washed with deionized water three times. The organic layer was dried over sodium sulfate, and a wax material was obtained upon removal of solvent.

Part 3. Preparation and Testing of Mechanochromic Films and Coatings

Example 13

According to the amounts in Table 1, the polymer from Example 7 and DABCO were solubilized in the anhydrous THF then heated at 60° C. for 30 minutes. The DESMODUR W was added dropwise to the solution, and the resulting mixture was stirred at 60° C. for 2 hours. This mixture was removed from the heat and polyTHF 250 was added dropwise while stirring, then the mixture placed under a stream of Nitrogen for 4 hours to evaporate solvent. The HDI was then mixed in, and the resulting polymer was then placed in a vacuum oven for 2 hours, it was then poured into a TEFLON® mold and baked at 60° C. for 36 hours. The resulting cast film was found to be mechanochromic.

TABLE 1

| Material | Parts by weight |
|---|---|
| Polymer from Example 7 | 0.8 |
| 1,4-diazabicyclo[2.2.2]octane (DABCO) | 0.06 |
| anhydrous tetrahydrofuran (THF) | 9.66 |
| DESMODUR ® W[1] | 25.75 |
| PolyTHF 250[2] | 62.44 |
| Hexamethylene diisocyanate (HDI) | 1.29 |

[1]A diisocyanate available from Bayer Corporation
[2]poly tetrahydrofuran of molecular weight approximately 250

Example 14-17

The following examples demonstrate the preparation of coating compositions and coatings that were tested for mechanochromic activity.

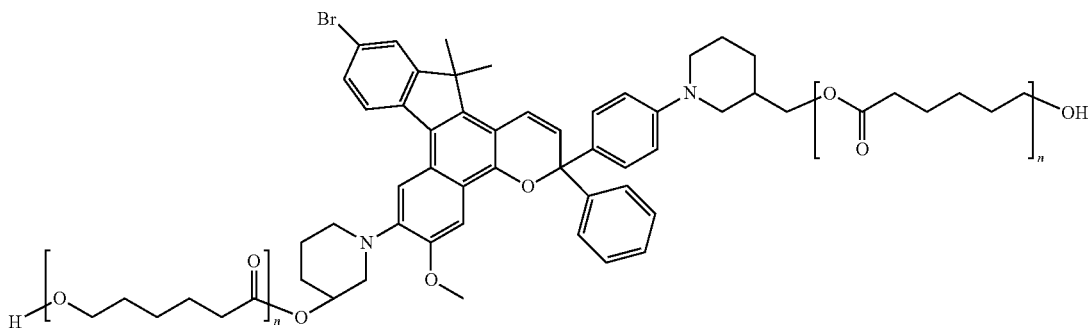

Coating formulations were prepared according to Table 2 in the following manner Charge 1 was added to the vessel with mixing and heated to 60° C. for approximately 30 minutes to dissolve the solids. Charge 2 was added to the solution and the resulting mixture heated at 60 C. for an additional 60 minutes. The materials of Charge 3 and Charge 4 were added in the order listed. The resulting mixture was placed in a 120 mL container and placed on a mechanical stir device for 16 hours.

TABLE 2

| Material | Example 14 Parts by weight | Example 15 Parts by weight | Example 16 Parts by weight | Example 17 Parts by weight |
|---|---|---|---|---|
| Charge 1 | | | | |
| Polymer dye from Example 12 | 0.00 | 6.74 | 0.00 | 0.00 |
| Hydroxyl-functional indeno compound[1] | 6.15 | 0.00 | 0.00 | 0.00 |
| Polymer dye from Example 11 | 0.00 | 0.00 | 6.15 | 0.00 |
| Polymer dye from Example 7 | 0.00 | 0.00 | 0.00 | 7.54 |
| TINUVIN ®144[2] | 0.00 | 2.25 | 0.00 | 2.51 |
| N-Methyl-2-pyrrolidone (NMP) | 23.66 | 10.02 | 23.66 | 8.89 |
| IRGANOX ® 245[3] | 0.00 | 2.25 | 0.00 | 2.51 |
| Charge 2 | | | | |
| IPDI PL 340[4] | 34.57 | 42.49 | 34.57 | 42.37 |
| Charge 3 | | | | |
| Acrylic polyol[5] | 14.37 | 17.66 | 14.37 | 17.61 |
| PH200D[6] | 12.57 | 15.45 | 12.57 | 15.41 |
| Charge 4 | | | | |
| BYK ® 333 (10% in NMP)[7] | 0.32 | 0.40 | 0.32 | 0.32 |
| K-KAT ® 348[8] | 0.47 | 0.52 | 0.47 | 0.52 |
| SILQUEST ® A-187 epoxy silane[9] | 2.05 | 2.59 | 2.05 | 2.58 |
| Mechanically active | NO | YES | NO | YES |

[1] 3-(4-2-hydroxyethoxyphenyl)-3-(4-hydroxyphenyl)-6-methoxy-7-(3-hydroxyoxymethyl)piperidin-1-yl)-13,13-dimethyl-3,13-dihydro-indeno[2',3':3,4]naphtho[1,2-b]pyran
[2] A Hindered Amine Light Stabilizer available from BASF
[3] An antioxidant available from BASF Corporation
[4] A diisocyanate available from Bayer Corporation
[5] An acrylic polyol comprised of 20.7% triphenylphosphite, 41.3% tertiary-dodecyl mercaptan, 8% acrylic acid, 13% n-butyl methacrylate and 17% hydroxypropyl methacrylate, at 60% solids in glycol acetate solvent, with a molecular weight of 5500.
[6] A polycarbonate diol available from Ube Corporation
[7] Polyether-modified polydimethylsiloxane available from BYK Chemie
[8] Bismuth-based catalyst available from King Industries, Inc.
[9] Epoxy silane available from Momentive Performance Chemicals Polycarbonate CR39 substrate with an area of 4 square inches (obtained from Piedmont Plastics), were treated with a corona discharge from a TANTEC® EST-Electrical Service Treatment unit operated at 500 Watts and 54 kVA for 45 seconds. The coating compositions were then spin coated to the prepared substrate and baked at 125° C. for 1 hour.

Mechanical activity was determined by rubbing the coated surface with a sharp or blunt object and observing a visible color change. Mechanical activation for Examples 17, 19, and 20 was observed upon cutting the surface with the tip of a paperclip. Mechanical activity with example 18 was observed upon rubbing the surface with a blunt object, then activating with UV light. Example 18 demonstrates that it is possible to have combined mechanochromic-photochromic activation.

The present invention has been described with reference to specific details of particular embodiments thereof. It is not intended that such details be regarded as limitations upon the scope of the invention except insofar as and to the extent that they are included in the accompanying claims.

What is claimed is:

1. A polymer composition comprising a polymer, said polymer comprising at least one polymer chain segment represented by the following Formula (I), $$\Phi-[(M)_w]_z \quad (I)$$

wherein M independently for each w is a residue of a monomer,
Φ is a residue of a mechanochromic compound having at least two reactive groups that are each independently bonded to one monomer residue M,
w, independently for each z, is an integer of at least 1, and z is 2,
further wherein said mechanochromic compound is selected from,
(a) a spirooxazine compound represented by the following Formula (II),

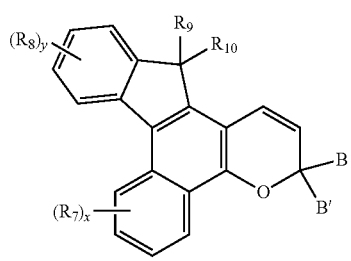

(II)

wherein n is from 1 to 4, p is from 1 to 2, q is from 1 to 4, and $R_1$ independently for each n, $R_2$ independently for each p, $R_3$ independently for each q, $R_4$, $R_5$, and $R_6$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N($R^{11}$)—, and —Si($R^{11}$)($R^{12}$)— wherein $R^{11}$ and $R^{12}$ are each independently selected from hydrogen, hydrocarbyl and substituted hydrocarbyl, and combinations of two or more thereof,
provided that for the spirooxazine represented by Formula (II) two of, $R_1$ independently for each n, $R_2$ independently for each p, $R_3$ independently for each q, $R_4$, $R_5$, and $R_6$, each independently comprise said reactive group that is independently bonded to one monomer residue M,
wherein the spirooxazine represented by Formula (II) comprises one first reactive group, and one second reactive group,
further wherein for the spirooxazine represented by Formula (II) one of $R_1$, and $R_2$, independently comprise said first reactive group and one of $R_3$, $R_4$, $R_5$ and $R_6$ comprise said second reactive group,
(b) an indenonaphthopyran represented by the following Formula (III), (III)

wherein x is from 1 to 4, y is from 1 to 4, $R_7$ independently for each x, $R_8$ independently for each y, $R_9$, and $R_{10}$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N(R$^{11}$)—, and —Si(R$^{11}$)(R$^{12}$)— wherein R$^{11}$ and R$^{12}$ are each independently selected from hydrogen, hydrocarbyl and substituted hydrocarbyl, and combinations of two or more thereof, and B and B' are each independently selected from unsubstituted aryl, substituted aryl, unsubstituted heteroaryl, substituted heteroaryl, and polyalkoxy, or B and B' taken together form a ring structure selected from unsubstituted fluoren-9-ylidene, substituted fluoren-9-ylidene, saturated spiro-monocyclic hydrocarbon ring, saturated Spiro-bicyclic hydrocarbon ring, and spiro-tricyclic hydrocarbon ring, provided that for the indenonaphthopyran represented by Formula (III), two of, $R_7$, $R_8$, $R_9$, $R_{10}$, B, and B' each independently comprise said reactive group that is independently bonded to one monomer residue M, wherein the indenonaphthopyran represented by Formula (III) comprises one first reactive group, and one second reactive group, further wherein for the indenonaphthopyran represented by Formula (III) one of B and B' comprise said first reactive group, and one of $R_7$, $R_8$, $R_9$ and $R_{10}$ comprise said second reactive group.

2. The polymer composition of claim 1 wherein,
for the spirooxazine represented by Formula (II) one $R_2$ comprises said first reactive group, and one $R_3$ comprises said second reactive group, and
for the indenonaphthopyran represented by Formula (III) one of B and B' comprise said first reactive group, and one of $R_7$ and $R_8$ comprise said second reactive group.

3. The polymer composition of claim 1 wherein, said reactive groups of said mechanochromic compound are each independently selected from active hydrogen groups, and groups that are reactive with active hydrogen groups.

4. The polymer composition of claim 3 wherein,
the active hydrogen groups of said mechanochromic compound are each independently selected from hydroxyl, thiol, primary amine, secondary amine, and carboxylic acid, and
the groups that are reactive with active hydrogen groups, of said mechanochromic compound, are each independently selected from carboxylic acid halides, cyclic carboxylic acid anhydrides, oxiranes, thiooxiranes, isocyanates, thioisocyanates, cyclic carboxylic acid esters, cyclic amides, and cyclic carbonates.

5. The polymer composition of claim 3 wherein, each monomer independently comprises at least one monomer reactive group selected from active hydrogen groups, and groups that are reactive with active hydrogen groups.

6. The polymer composition of claim 5 wherein,
each active hydrogen group of each monomer is independently selected from hydroxyl, thiol, primary amine, secondary amine, and carboxylic acid, and
each group that is reactive with active hydrogen groups, of each monomer, is independently selected from carboxylic acid halides, cyclic carboxylic acid anhydrides, oxiranes, thiooxiranes, isocyanates, thioisocyanates, cyclic carboxylic acid esters, cyclic amides, and cyclic carbonates.

7. The polymer composition of claim 1 wherein, said polymer is selected from polyester polymers, polyurethane polymers, polycarbonate polymers, polyether polymers, polyamide polymers, polyimide polymers, polyamideimide polymers, polyurea polymers, polysulfone polymers, polyketone polymers, and combinations of two or more thereof.

8. The polymer composition of claim 1 wherein,
for the spirooxazine compound represented by Formula (II),
$R_1$ independently for each n and $R_2$ independently for each p are each independently selected from hydrogen, aryl, mono($C_1$-$C_6$)alkoxyaryl, di($C_1$-$C_6$)alkoxyaryl, mono($C_1$-$C_6$)alkylaryl, di($C_1$-$C_6$)alkylaryl, bromoaryl, chloroaryl, fluoroaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_6$)alkyl, $C_3$-$C_7$ cycloalkyloxy($C_1$-$C_6$)alkoxy, aryl($C_1$-$C_6$)alkyl, aryl($C_1$-$C_6$)alkoxy, aryloxy, aryloxy($C_1$-$C_6$)alkyl, aryloxy($C_1$-$C_6$)alkoxy, mono- or di($C_1$-$C_6$)alkylaryl($C_1$-$C_6$)alkyl, mono- or di($C_1$-$C_6$)alkoxyaryl($C_1$-$C_6$)alkyl, mono- or di($C_1$-$C_6$)alkylaryl($C_1$-$C_6$)alkoxy, mono- or di($C_1$-$C_6$)alkoxyaryl($C_1$-$C_6$)alkoxy, amino, mono($C_1$-$C_6$)alkylamino, di($C_1$-$C_6$)alkylamino, diarylamino, N—($C_1$-$C_6$)alkylpiperazino, N-arylpiperazino, aziridino, indolino, piperidino, arylpiperidino, morpholine, thiomorpholino, tetrahydroquinolino, tetrahydroisoquinolino, pyrryl, $C_1$-$C_6$ alkyl, $C_1$-$C_6$ bromoalkyl, $C_1$-$C_6$ chloroalkyl, $C_1$-$C_6$ fluoroalkyl, $C_1$-$C_6$ alkoxy, mono($C_1$-$C_6$)alkoxy($C_1$-$C_4$)alkyl, acryloxy, methacryloxy, acyloxy($C_1$-$C_6$ alkyl), acyloxy($C_3$-$C_7$ cycloalkyl), acyloxy(aryl), bromo, chloro or fluoro, $R_3$ is, independently for each q, chosen from hydrogen, $C_1$-$C_5$ alkyl, $C_1$-$C_5$ alkoxy, nitro, cyano, $C_1$-$C_8$ alkoxycarbonyl, acyloxy($C_1$-$C_6$ alkyl), acyloxy($C_3$-$C_7$ cycloalkyl), acyloxy(aryl), halo, $C_1$-$C_4$ monohaloalkyl or $C_1$-$C_4$ polyhaloalkyl; said halo substituents being chloro, fluoro, iodo or bromo, $R_4$ is chosen from hydrogen, $C_1$-$C_8$ alkyl, $C_3$-$C_7$ cycloalkyl, phen($C_1$-$C_4$)alkyl, naphth($C_1$-$C_4$)alkyl, allyl, acrylyloxy($C_2$-$C_6$)alkyl, methacrylyloxy($C_2$-$C_6$)alkyl, $C_2$-$C_4$ acyloxy($C_2$-$C_6$)alkyl, carboxy($C_2$-$C_6$)alkyl, cyano($C_2$-$C_6$)alkyl, hydroxy($C_2$-$C_6$)alkyl, triarylsilyl, triarylsilyloxy, tri($C_1$-$C_6$)alkylsilyloxy, tri($C_1$-$C_6$)alkoxysilyl, tri($C_1$-$C_6$)alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$)alkoxy($C_1$-$C_6$ alkyl)silyl, di($C_1$-$C_6$)alkoxy($C_1$-$C_6$ alkyl)silyloxy, $C_1$-$C_6$ alkoxy($C_2$-$C_4$)alkyl or ($C_2H_4O$)$_r$CH$_3$, wherein r is an integer from 1 to 6, $R_5$ and $R_6$ are each independently selected from hydrogen, $C_1$-$C_5$ alkyl, acyloxy($C_1$-$C_6$ alkyl), acyloxy($C_3$-$C_7$ cycloalkyl), acyloxy(aryl), benzyl, phenyl, mono- or di-substituted phenyl, said phenyl substituents being $C_1$-$C_5$ alkyl or $C_1$-$C_5$ alkoxy; or $R_5$ and $R_6$ taken together form a group chosen from a cyclic ring of from 5 to 8 carbon atoms which includes the Spiro carbon atom, for the indenonaphthopyran represented by Formula (III),
$R_7$ independently for each x and $R_8$ independently for each y are each independently selected from,
hydrogen,
a compatiblizing substituent;
halogen selected from fluoro and chloro;
$C_1$-$C_{20}$ alkyl;
$C_3$-$C_{10}$ cycloalkyl;
acyloxy($C_1$-$C_6$ alkyl), acyloxy($C_3$-$C_7$ cycloalkyl), acyloxy(aryl);

substituted or unsubstituted phenyl, the phenyl substituents being selected from hydroxyl, halogen, carbonyl, $C_1$-$C_{20}$ alkoxycarbonyl, cyano, halo($C_1$-$C_{20}$)alkyl, $C_1$-$C_{20}$ alkyl or $C_1$-$C_{20}$ alkoxy;

—O—$R_{10}'$ or —C(O)—$R_{10}'$ or —C(O)—O$R_{10}'$, wherein $R_{10}'$ is hydrogen, $C_1$-$C_{20}$ alkyl, phenyl($C_1$-$C_{20}$)alkyl, mono($C_1$-$C_{20}$)alkyl substituted phenyl($C_1$-$C_{20}$)alkyl, mono($C_1$-$C_{20}$)alkoxy substituted phenyl ($C_1$-$C_{20}$)alkyl, ($C_1$-$C_{20}$)alkoxy($C_2$-$C_{20}$)alkyl, $C_3$-$C_{10}$ cycloalkyl, or mono($C_1$-$C_{20}$)alkyl substituted $C_3$-$C_{10}$ cycloalkyl; —N($R_{11}'$)$R_{12}'$, wherein $R_{11}'$ and $R_{12}'$ are each independently hydrogen, $C_1$-$C_{20}$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_{20}$ alkylaryl, $C_3$-$C_{10}$ cycloalkyl, $C_4$-$C_{20}$ bicycloalkyl, $C_5$-$C_{20}$ tricycloalkyl or $C_1$-$C_{20}$ alkoxyalkyl, wherein said aryl group is phenyl or naphthyl, or $R_{11}'$ and $R_{12}'$ come together with the nitrogen atom to form a $C_3$-$C_{20}$ hetero-bicycloalkyl ring or a $C_4$-$C_{20}$ heterotricycloalkyl ring;

a nitrogen containing ring represented by the following graphic formula IVA,

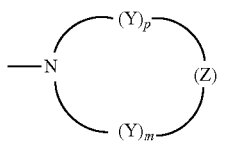

IVA wherein each —Y— is independently chosen for each occurrence from —$CH_2$—, —CH($R_{13}'$)—, —C($R_{13}'$)$_2$—, —CH(aryl)-, —C(aryl)$_2$-, and —C($R_{13}'$)(aryl)-, and Z is —Y—, —O—, —S—, —S(O)—, —$SO_2$—, —NH—, —N($R_{13}'$)-, or —N(aryl)-, wherein each $R_{13}'$ is independently $C_1$-$C_{20}$ alkyl, each aryl is independently phenyl or naphthyl, m is an integer 1, 2 or 3, and p is an integer 0, 1, 2, or 3 and provided that when p is 0, Z is —Y—;

a group represented by one of the following graphic formulas IVB or IVC,

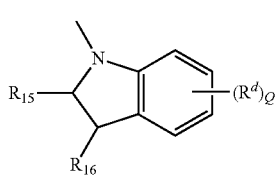

IVB

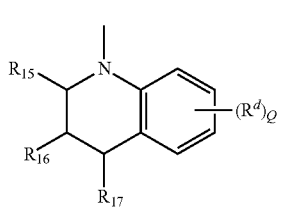

IVC wherein $R_{15}$ is, $R_{16}$, and $R_{17}$ are each independently hydrogen, $C_1$-$C_6$ alkyl, phenyl, or naphthyl, or the groups $R_{15}$ and $R_{16}$ together form a ring of 5 to 8 carbon atoms and each $R^d$ is independently for each occurrence selected from $C_1$-$C_{20}$ alkyl, $C_1$-$C_{20}$ alkoxy, fluoro or chloro, and Q is an integer 0, 1, 2, or 3; and unsubstituted, mono-, or di-substituted $C_4$-$C_{18}$ spirobicyclic amine, or unsubstituted, mono-, and di-substituted $C_4$-$C_{18}$ spirotricyclic amine, wherein said substituents are independently aryl, $C_1$-$C_{20}$ alkyl, $C_1$-$C_{20}$ alkoxy, or phenyl($C_1$-$C_{20}$)alkyl; or two adjacent $R_7$ groups, or two adjacent $R_8$ groups, independently together form a group represented by one of IVD and IVE:

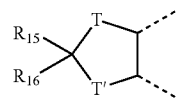

IVD

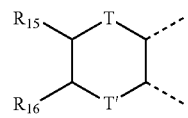

IVE wherein T and T' are each independently oxygen or the group —$NR_{11}'$-, where $R_{11}'$, $R_{15}$, and $R_{16}$ are as set forth above, $R_9$ and $R_{10}$ are each independently selected from, (i) hydrogen, $C_1$-$C_{20}$ alkyl, $C_1$-$C_{20}$ haloalkyl, $C_3$-$C_{10}$ cycloalkyl, acyloxy($C_1$-$C_6$ alkyl), acyloxy($C_3$-$C_7$ cycloalkyl), acyloxy(aryl), allyl, benzyl, or monosubstituted benzyl, said benzyl substituents being chosen from halogen, $C_1$-$C_{20}$ alkyl or $C_1$-$C_{20}$ alkoxy;

(ii) an unsubstituted, mono- di- or tri-substituted group chosen from phenyl, naphthyl, phenanthryl, pyrenyl, quinolyl, isoquinolyl, benzofuranyl, thienyl, benzothienyl, dibenzofuranyl, dibenzothienyl, carbazolyl, or indolyl, said group substituents in each case being independently chosen from halogen, $C_1$-$C_{20}$ alkyl or $C_1$-$C_{20}$ alkoxy;

(iii) mono-substituted phenyl, said substituent located at the para position being —$(CH_2)_t$— or —O—$(CH_2)_t$—, wherein t is the integer 1, 2, 3, 4, 5 or 6, said substituent being connected to an aryl group which is a member of a photochromic material;

(iv) the group —CH($R^{18}$)G, wherein $R^{18}$ is hydrogen, $C_1$-$C_6$ alkyl or the unsubstituted, mono- or di-substituted aryl groups phenyl or naphthyl, and G is —$CH_2OR^{19}$, wherein $R^{19}$ is hydrogen, —C(O)$R^{10}$, $C_1$-$C_{20}$ alkyl, $C_1$-$C_{20}$ alkoxy($C_1$-$C_{20}$)alkyl, phenyl($C_1$-$C_{20}$)alkyl, mono($C_1$-$C_{20}$)alkoxy substituted phenyl($C_1$-$C_{20}$)alkyl, or the unsubstituted, mono- or di-substituted aryl groups phenyl or naphthyl, each of said phenyl and naphthyl group substituents being $C_1$-$C_{20}$ alkyl or $C_1$-$C_{20}$ alkoxy; or (v) $R^9$ and $R^{10}$ together form a Spiro substituent selected from a substituted or unsubstituted spirocarbocyclic ring containing 3 to 6 carbon atoms, a substituted or unsubstituted spiro-heterocyclic ring containing 1 or 2 oxygen atoms and 3 to 6 carbon atoms including the spirocarbon atom, said Spirocarbocyclic ring and spiro-heterocyclic ring being annellated with 0, 1 or 2 benzene rings, said substituents being hydrogen or $C_1$-$C_{20}$ alkyl; and B and B' are each independently:

an aryl group that is mono-substituted with a compatiblizing substituent; a substituted phenyl; a substituted aryl; a substituted 9-julolindinyl; a substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl, wherein the phenyl, aryl, 9-julolindinyl, or heteroaromatic substituent is a reactive substituent R; an unsubstituted, mono-, di-, or tri-substituted phenyl or aryl group; 9-julolidinyl; or an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl, wherein each of the phenyl, aryl and heteroaromatic substituents are each independently:

hydroxyl, a group —C(=O)$R_{21}$, wherein $R_{21}$ is –O$R_{22}$, —N($R_{23}$)$R_{24}$, piperidino, or morpholino, wherein $R_{22}$ is allyl, $C_1$-$C_{20}$ alkyl, phenyl, mono ($C_1$-$C_{20}$)alkyl substituted phenyl, mono($C_1$-$C_{20}$) alkoxy substituted phenyl, phenyl($C_1$-$C_{20}$)alkyl, mono($C_1$-$C_{20}$)alkyl substituted phenyl($C_1$-$C_{20}$) alkyl, mono($C_1$-$C_{20}$)alkoxy substituted phenyl($C_1$-$C_{20}$)alkyl, $C_1$-$C_{20}$ alkoxy($C_2$-$C_{20}$)alkyl or $C_1$-$C_{20}$ haloalkyl, $R_{23}$ and $R_{24}$ are each independently $C_1$-$C_{20}$ alkyl, $C_5$-$C_{10}$ cycloalkyl, phenyl or substituted phenyl, the phenyl substituents being $C_1$-$C_{20}$ alkyl or $C_1$-$C_{20}$ alkoxy, and said halo substituent is chloro or fluoro, aryl, mono($C_1$-$C_{20}$)alkoxyaryl, di($C_1$-$C_{20}$)alkoxyaryl, mono($C_1$-$C_{20}$)alkylaryl, di($C_1$-$C_{20}$)alkylaryl, haloaryl, $C_3$-$C_{10}$ cycloalkylaryl, $C_3$-$C_{10}$ cycloalkyl, $C_3$-$C_{10}$ cycloalkyloxy, $C_3$-$C_{10}$ cycloalkyloxy($C_1$-$C_{20}$)alkyl, $C_3$-$C_{10}$ cycloalkyloxy($C_1$-$C_{20}$)alkoxy, aryl($C_1$-$C_{20}$)alkyl, aryl($C_1$-$C_{20}$)alkoxy, aryloxy, aryloxy($C_1$-$C_{20}$) alkyl, aryloxy($C_1$-$C_{20}$)alkoxy, mono- or di($C_1$-$C_{20}$)alkylaryl($C_1$-$C_{20}$)alkyl, mono- or di-($C_1$-$C_{20}$) alkoxyaryl($C_1$-$C_{20}$)alkyl, mono- or di-($C_1$-$C_{20}$) alkylaryl($C_1$-$C_{20}$)alkoxy, mono- or di-($C_1$-$C_{20}$) alkoxyaryl($C_1$-$C_{20}$)alkoxy, amino, mono- or di-($C_1$-$C_{20}$)alkylamino, diarylamino, piperazino, N—($C_1$-$C_{20}$)alkylpiperazino, N-arylpiperazino, aziridino, indolino, piperidino, morpholino, thiomorpholino, tetrahydroquinolino, tetrahydroisoquinolino, pyrrolidyl, $C_1$-$C_{20}$ alkyl, $C_1$-$C_{20}$ haloalkyl, $C_1$-$C_{20}$ alkoxy, mono($C_1$-$C_{20}$)alkoxy ($C_1$-$C_{20}$)alkyl, acryloxy, methacryloxy, acyloxy ($C_1$-$C_6$ alkyl), acyloxy($C_3$-$C_7$ cycloalkyl), acyloxy (aryl), or halogen;

an unsubstituted or mono-substituted group chosen from pyrazolyl, imidazolyl, pyrazolinyl, imidazolinyl, pyrrolinyl, phenothiazinyl, phenoxazinyl, phenazinyl, and acridinyl, each of said substituents being $C_1$-$C_{20}$ alkyl, $C_1$-$C_{20}$ alkoxy, phenyl, or halogen;

a group represented by one of:

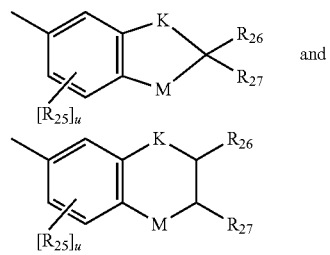

wherein K is —$C_{1-12}$— or —O—, and M is —O— or substituted nitrogen, provided that when M is substituted nitrogen, K is —$CH_2$—, the substituted nitrogen substituents being hydrogen, $C_1$-$C_{20}$ alkyl, or $C_1$-$C_{20}$ acyl, each $R_{25}$ being independently chosen for each occurrence from $C_1$-$C_{20}$ alkyl, $C_1$-$C_{20}$ alkoxy, hydroxy, and halogen, $R_{26}$ and $R_{27}$ each being independently hydrogen or $C_1$-$C_{20}$ alkyl, and u is an integer ranging from 0 to 2; or a group represented by:

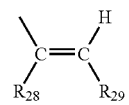

wherein $R_{28}$ is hydrogen or $C_1$-$C_{20}$ alkyl, and $R_{29}$ is an unsubstituted, mono-, or di-substituted group chosen from naphthyl, phenyl, furanyl, and thienyl, wherein the substituents are $C_1$-$C_{20}$ alkyl, $C_1$-$C_{20}$alkoxy, or halogen; or B and B' taken together form one of a fluoren-9-ylidene, mono-, or di-substituted fluoren-9-ylidene, each of said fluoren-9-ylidene substituents being independently chosen from $C_1$-$C_{20}$ alkyl, $C_1$-$C_{20}$ alkoxy, and halogen.

9. The polymer composition of claim 8 wherein, for the spirooxazine compound represented by Formula (II), $R_1$ independently for each n and $R_2$ independently for each p are each independently selected from hydrogen, aryl, mono($C_1$-$C_6$)alkoxyaryl, di($C_1$-$C_6$)alkylamino, piperidino, morpholino, $C_1$-$C_6$ alkoxy, or fluoro, $R_3$ is, independently for each q, selected from hydrogen, $C_1$-$C_5$ alkyl, $C_1$-$C_5$ alkoxy, $C_1$-$C_8$ alkoxycarbonyl, acyloxy($C_1$-$C_6$ alkyl), acyloxy($C_3$-$C_7$ cycloalkyl), acyloxy(aryl), halo, $C_1$-$C_4$ monohaloalkyl or $C_1$-$C_4$ polyhaloalkyl; and said halo substituents being chloro or fluoro, $R_4$ is selected from hydrogen, $C_1$-$C_8$ alkyl, phen($C_1$-$C_4$) alkyl, acrylyloxy($C_2$-$C_6$)alkyl, methacrylyloxy($C_2$-$C_6$)alkyl, carboxy($C_2$-$C_6$)alkyl, tri($C_1$-$C_6$)alkylsilyl, tri($C_1$-$C_6$)alkylsilyloxy, tri($C_1$-$C_6$)alkoxysilyl, tri($C_1$-$C_6$)alkoxysilyloxy, di($C_1$-$C_6$)alkyl($C_1$-$C_6$ alkoxy)silyl, di($C_1$-$C_6$)alkyl($C_1$-$C_6$ alkoxy)silyloxy, di($C_1$-$C_6$) alkoxy($C_1$-$C_6$ alkyl)silyl or di($C_1$-$C_6$)alkoxy($C_1$-$C_6$ alkyl)silyloxy, and $R_5$ and $R_6$ are each independently selected from hydrogen, $C_1$-$C_5$ alkyl, phenyl; or $R_5$ and $R_6$ taken together form a group chosen from a cyclic ring of from 5 to 8 carbon atoms which includes the Spiro carbon atom, and for the indenonaphthopyran represented by Formula (III),
$R_7$ independently for each x and $R_8$ independently for each y are each independently selected from, hydrogen, $C_1$-$C_6$ alkyl, $C_3$-$C_7$ cycloalkyl, morpholino, morpholino substituted with $C_1$-$C_8$ linear or branched alkyl, $C_1$-$C_8$ haloalkyl, fluoro, chloro, and —O—$R_{10}$',
$R_9$ and $R_{10}$ are each independently selected from hydrogen, $C_1$-$C_8$ alkyl, $C_1$-$C_8$ haloalkyl, and $C_3$-$C_7$ cycloalkyl, or together form a spiro substituent selected from a substituted or unsubstituted spirocarbocyclic ring containing 3 to 6 carbon atoms, and
B and B' are each independently selected from aryl, aryl substituted with $C_1$-$C_6$ alkoxy, and aryl substituted with morpholino.

10. The polymer composition of claim 1, wherein said polymer comprises at least one active hydrogen group selected from hydroxyl, thiol, carboxylic acid, primary amine, and secondary amine, and
said polymer composition further comprises at least one crosslinking agent comprising at least two functional groups selected from cyclic carboxylic acid anhydrides, oxiranes, thiooxiranes, isocyanates, thioisocyanates, cyclic carboxylic acid esters, cyclic amides, and cyclic carbonates.

11. The polymer composition of claim 1 further comprising an additive selected from heat stabilizers, light stabilizers, and combinations thereof.

12. A mechanochromic article comprising the polymer composition of claim 1, wherein said mechanochromic article is selected from films, sheets, and 3-dimensional articles.

13. The mechanochromic article of claim 12 wherein said 3-dimensional articles are selected from ophthalmic articles, display articles, windows, mirrors, protective articles, and support articles.

14. The mechanochromic article of claim 13 wherein said mechanochromic article is selected from ophthalmic articles, and said ophthalmic articles are selected from corrective lenses, non-corrective lenses, contact lenses, and magnifying lenses.

15. The mechanochromic article of claim 13 wherein said mechanochromic article is selected from display articles, and said display articles are selected from screens, monitors, and security elements.

16. The mechanochromic article of claim 13 wherein said mechanochromic article is selected from protective articles, and said protective articles are selected from protective lenses, protective visors, protective headgear, and protective housings.

17. The mechanochromic article of claim 13 wherein said mechanochromic article is selected from support articles, and said support articles are selected from rods, beams, crossarms, and combinations thereof.

18. The mechanochromic article of claim 12 wherein said mechanochromic article is selected from 3-dimensional articles, and each 3-dimensional article comprises a coating residing over at least a portion of at least one surface of each 3-dimensional article, further wherein said coating comprises said polymer composition of claim 1.

19. A mechanochromic article comprising the polymer composition of claim 1 wherein said mechanochromic article further comprises a coating residing over at least a portion of at least one surface of said mechanochromic article, said coating being free of said polymer composition of claim 1, and said coating comprising an additive selected from heat stabilizers, light stabilizers, and combinations thereof.

20. A polymer composition comprising a polymer, said polymer comprising at least one polymer chain segment represented by the following Formula (I),

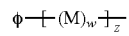

(I)

wherein M independently for each w is a residue of a monomer,
Φ is a residue of a mechanochromic compound having at least two reactive groups that are each independently bonded to one monomer residue M,
w, independently for each z, is an integer of at least 1, and z is an integer of at least 2,
further wherein said mechanochromic compound is selected from,
(a) a spirooxazine compound represented by the following Formula (II),

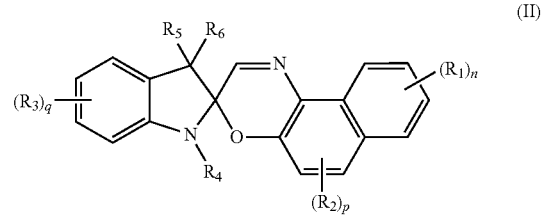

(II)

wherein n is from 1 to 4, p is from 1 to 2, q is from 1 to 4, and $R_1$ independently for each n, $R_2$ independently for each p, $R_3$ independently for each q, $R_4$, $R_5$, and $R_6$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N($R^{11}$)—, and —Si($R^{11}$)($R^{12}$)— wherein $R^{11}$ and $R^{12}$ are each independently selected from hydrogen, hydrocarbyl and substituted hydrocarbyl, and combinations of two or more thereof,
provided that for the spirooxazine represented by Formula (II) at least two of, $R_1$ independently for each n, $R_2$ independently for each p, $R_3$ independently for each q, $R_4$, $R_5$, and $R_6$, each independently comprise said reactive group that is independently bonded to one monomer residue M, (b) an indenonaphthopyran represented by the following Formula (III),

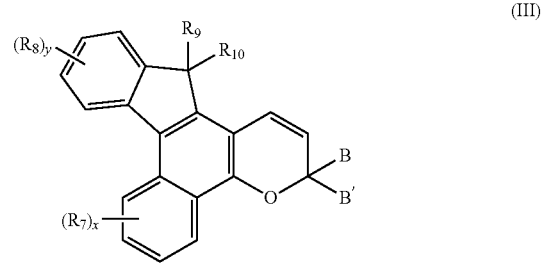

(III)

wherein x is from 1 to 4, y is from 1 to 4, $R_7$ independently for each x, $R_8$ independently for each y, $R_9$, and $R_{10}$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N(R$^{11}$)—, and —Si(R$^{11}$)(R$^{12}$)— wherein R$^{11}$ and R$^{12}$ are each independently selected from hydrogen, hydrocarbyl and substituted hydrocarbyl, and combinations of two or more thereof, and B and B' are each independently selected from unsubstituted aryl, substituted aryl, unsubstituted heteroaryl, substituted heteroaryl, and polyalkoxy, or B and B' taken together form a ring structure selected from unsubstituted fluoren-9-ylidene, substituted fluoren-9-ylidene, saturated spiro-monocyclic hydrocarbon ring, saturated spiro-bicyclic hydrocarbon ring, and spiro-tricyclic hydrocarbon ring, provided that for the indenonaphthopyran represented by Formula (III), at least two of, R$_7$, R$_8$, R$_9$, R$_{10}$, B, and B' each independently comprise said reactive group that is independently bonded to one monomer residue M, wherein said polymer comprises at least one active hydrogen group selected from hydroxyl, thiol, carboxylic acid, primary amine, and secondary amine, and said polymer composition further comprises at least one crosslinking agent comprising at least two functional groups selected from cyclic carboxylic acid anhydrides, oxiranes, thiooxiranes, isocyanates, thioisocyanates, cyclic carboxylic acid esters, cyclic amides, and cyclic carbonates.

21. A mechanochromic article comprising a polymer composition,
wherein said mechanochromic article is selected from 3-dimensional articles, and each 3-dimensional article comprises a coating residing over at least a portion of at least one surface of each 3-dimensional article, further wherein said coating comprises said polymer composition,
wherein said polymer composition comprises a polymer, and said polymer comprises at least one polymer chain segment represented by the following Formula (I),

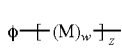
(I)

wherein M independently for each w is a residue of a monomer,
Φ is a residue of a mechanochromic compound having at least two reactive groups that are each independently bonded to one monomer residue M,
w, independently for each z, is an integer of at least 1, and z is an integer of at least 2,
further wherein said mechanochromic compound is selected from,
(a) a spirooxazine compound represented by the following Formula (II),

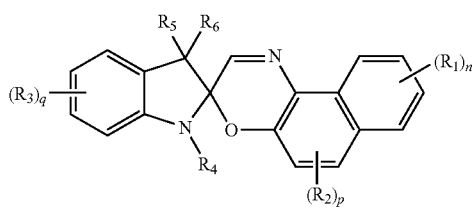
(II)

wherein n is from 1 to 4, p is from 1 to 2, q is from 1 to 4, and R$_1$ independently for each n, R$_2$ independently for each p, R$_3$ independently for each q, R$_4$, R$_5$, and R$_6$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N(R$^{11}$)—, and —Si(R$^{11}$)(R$^{12}$)— wherein R$^{11}$ and R$^{12}$ are each independently selected from hydrogen, hydrocarbyl and substituted hydrocarbyl, and combinations of two or more thereof, provided that for the spirooxazine represented by Formula (II) at least two of, R$_1$ independently for each n, R$_2$ independently for each p, R$_3$ independently for each q, R$_4$, R$_5$, and R$_6$, each independently comprise said reactive group that is independently bonded to one monomer residue M, (b) an indenonaphthopyran represented by the following Formula (III),

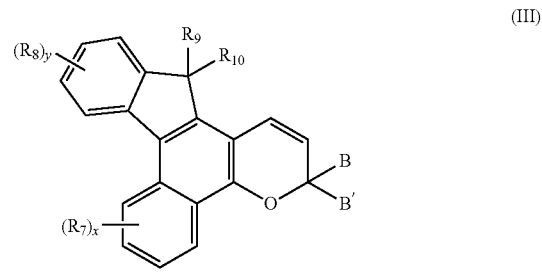
(III)

wherein x is from 1 to 4, y is from 1 to 4, R$_7$ independently for each x, R$_8$ independently for each y, R$_9$, and R$_{10}$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N(R$^{11}$)—, and —Si(R$^{11}$)(R$^{12}$)— wherein R$^{11}$ and R$^{12}$ are each independently selected from hydrogen, hydrocarbyl and substituted hydrocarbyl, and combinations of two or more thereof, and B and B' are each independently selected from unsubstituted aryl, substituted aryl, unsubstituted heteroaryl, substituted heteroaryl, and polyalkoxy, or B and B' taken together form a ring structure selected from unsubstituted fluoren-9-ylidene, substituted fluoren-9-ylidene, saturated spiro-monocyclic hydrocarbon ring, saturated spiro-bicyclic hydrocarbon ring, and spiro-tricyclic hydrocarbon ring, provided that for the indenonaphthopyran represented by Formula (III), at least two of, R$_7$, R$_8$, R$_9$, R$_{10}$, B, and B' each independently comprise said reactive group that is independently bonded to one monomer residue M.

22. A mechanochromic article comprising a polymer composition,
wherein said mechanochromic article further comprises a coating residing over at least a portion of at least one surface of said mechanochromic article, said coating being free of said polymer composition, and said coating comprising an additive selected from heat stabilizers, light stabilizers, and combinations thereof, wherein said polymer composition comprises a polymer, and said polymer comprises at least one polymer chain segment represented by the following Formula (I),

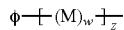
(I)

wherein M independently for each w is a residue of a monomer,
Φ is a residue of a mechanochromic compound having at least two reactive groups that are each independently bonded to one monomer residue M,
w, independently for each z, is an integer of at least 1, and
z is an integer of at least 2,
further wherein said mechanochromic compound is selected from,
(a) a spirooxazine compound represented by the following Formula (II),

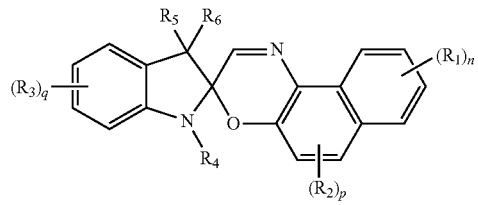
(II)

wherein n is from 1 to 4, p is from 1 to 2, q is from 1 to 4, and $R_1$ independently for each n, $R_2$ independently for each p, $R_3$ independently for each q, $R_4$, $R_5$, and $R_6$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N($R^{11}$)—, and —Si($R^{11}$)($R^{12}$)— wherein $R^{11}$ and $R^{12}$ are each independently selected from hydrogen, hydrocarbyl and substituted hydrocarbyl, and combinations of two or more thereof,
provided that for the spirooxazine represented by Formula (II) at least two of, $R_1$ independently for each n, $R_2$ independently for each p, $R_3$ independently for each q, $R_4$, $R_5$, and $R_6$, each independently comprise said reactive group that is independently bonded to one monomer residue M,
(b) an indenonaphthopyran represented by the following Formula (III),

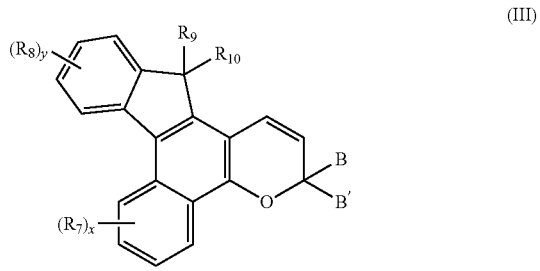
(III)

wherein x is from 1 to 4, y is from 1 to 4, $R_7$ independently for each x, $R_8$ independently for each y, $R_9$, and $R_{10}$ are each independently selected from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N($R^{11}$)—, and —Si($R^{11}$)($R^{12}$)— wherein $R^{11}$ and $R^{12}$ are each independently selected from hydrogen, hydrocarbyl and substituted hydrocarbyl, and combinations of two or more thereof, and
B and B' are each independently selected from unsubstituted aryl, substituted aryl, unsubstituted heteroaryl, substituted heteroaryl, and polyalkoxy, or B and B' taken together form a ring structure selected from unsubstituted fluoren-9-ylidene, substituted fluoren-9-ylidene, saturated spiro-monocyclic hydrocarbon ring, saturated spiro-bicyclic hydrocarbon ring, and spiro-tricyclic hydrocarbon ring,
provided that for the indenonaphthopyran represented by Formula (III), at least two of, $R_7$, $R_8$, $R_9$, $R_{10}$, B, and B' each independently comprise said reactive group that is independently bonded to one monomer residue M.

* * * * *